United States Patent
Benedetti

(10) Patent No.: US 10,264,812 B2
(45) Date of Patent: *Apr. 23, 2019

(54) APPARATUS FOR THE SEPARATION OF AGRICULTURAL PRODUCTS

(71) Applicant: UNITEC S.P.A., Lugo (RA) (IT)

(72) Inventor: Luca Benedetti, Savarna (IT)

(73) Assignee: UNITEC S.P.A., Lugo (RA) (IT)

( * ) Notice: Subject to any disclaimer, the term of this patent is extended or adjusted under 35 U.S.C. 154(b) by 23 days.

This patent is subject to a terminal disclaimer.

(21) Appl. No.: 15/325,185

(22) PCT Filed: Jun. 23, 2015

(86) PCT No.: PCT/IB2015/054689
§ 371 (c)(1),
(2) Date: Jan. 10, 2017

(87) PCT Pub. No.: WO2016/005842
PCT Pub. Date: Jan. 14, 2016

(65) Prior Publication Data
US 2017/0188619 A1    Jul. 6, 2017

(30) Foreign Application Priority Data

Jul. 11, 2014 (IT) .............................. PN2014A0035

(51) Int. Cl.
A23N 15/02    (2006.01)
A23N 15/00    (2006.01)

(52) U.S. Cl.
CPC ........ *A23N 15/02* (2013.01); *A23N 2015/006* (2013.01)

(58) Field of Classification Search
CPC ........ A23N 15/00; A23N 15/02; A23N 15/04; A23N 15/12; A23N 15/003
USPC ......... 99/495, 509–513, 537, 635, 636, 637, 99/638
See application file for complete search history.

(56) References Cited

U.S. PATENT DOCUMENTS

| | | | | |
|---|---|---|---|---|
| 2,825,375 A | * | 3/1958 | Gotelli | A23N 15/02 460/125 |
| 5,226,355 A | * | 7/1993 | Dimitriou | A23N 15/025 99/510 |
| 5,331,874 A | * | 7/1994 | Foster | B26D 3/11 198/626.6 |

FOREIGN PATENT DOCUMENTS

WO    WO 2014/009820 A1    1/2014

* cited by examiner

*Primary Examiner* — Phuong T Nguyen
(74) *Attorney, Agent, or Firm* — Birch, Stewart, Kolasch & Birch, LLP

(57) ABSTRACT

An apparatus for separation of agricultural products, which are normally joined to each other by a stem or the like, includes a conveyor for carrying agricultural products; a plurality of cutting modules positioned above the conveyor, each having a plurality of blades spaced along a rotating shaft, the shafts of the respective cutting modules being parallel to one another and orthogonal to the direction of movement of the conveyor; a positioning ramp associated with each blade; and a mechanism for simultaneously adjusting the height of the cutting modules above the conveyor to thereby enable the apparatus to effectively process agricultural products of varying sizes.

12 Claims, 25 Drawing Sheets

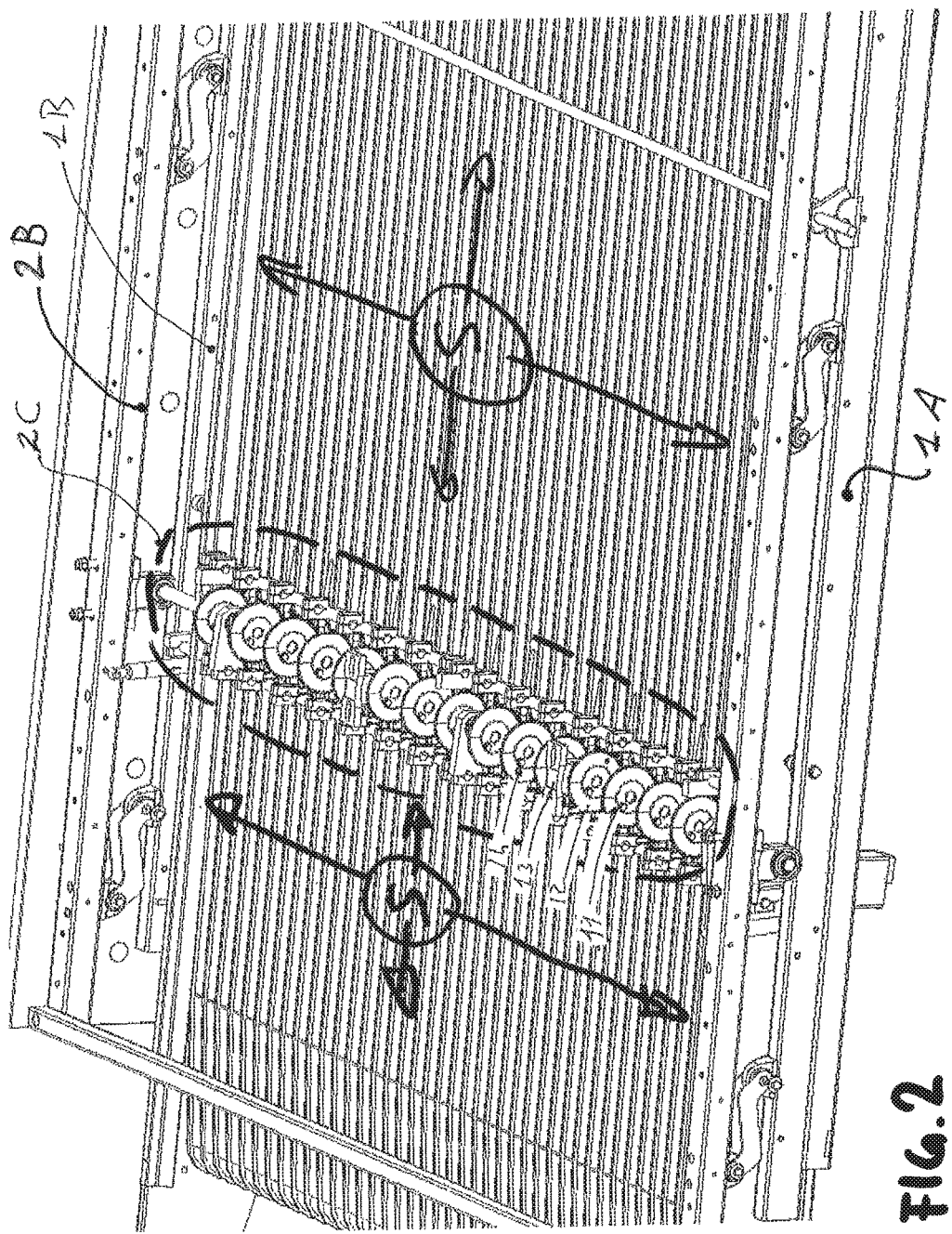

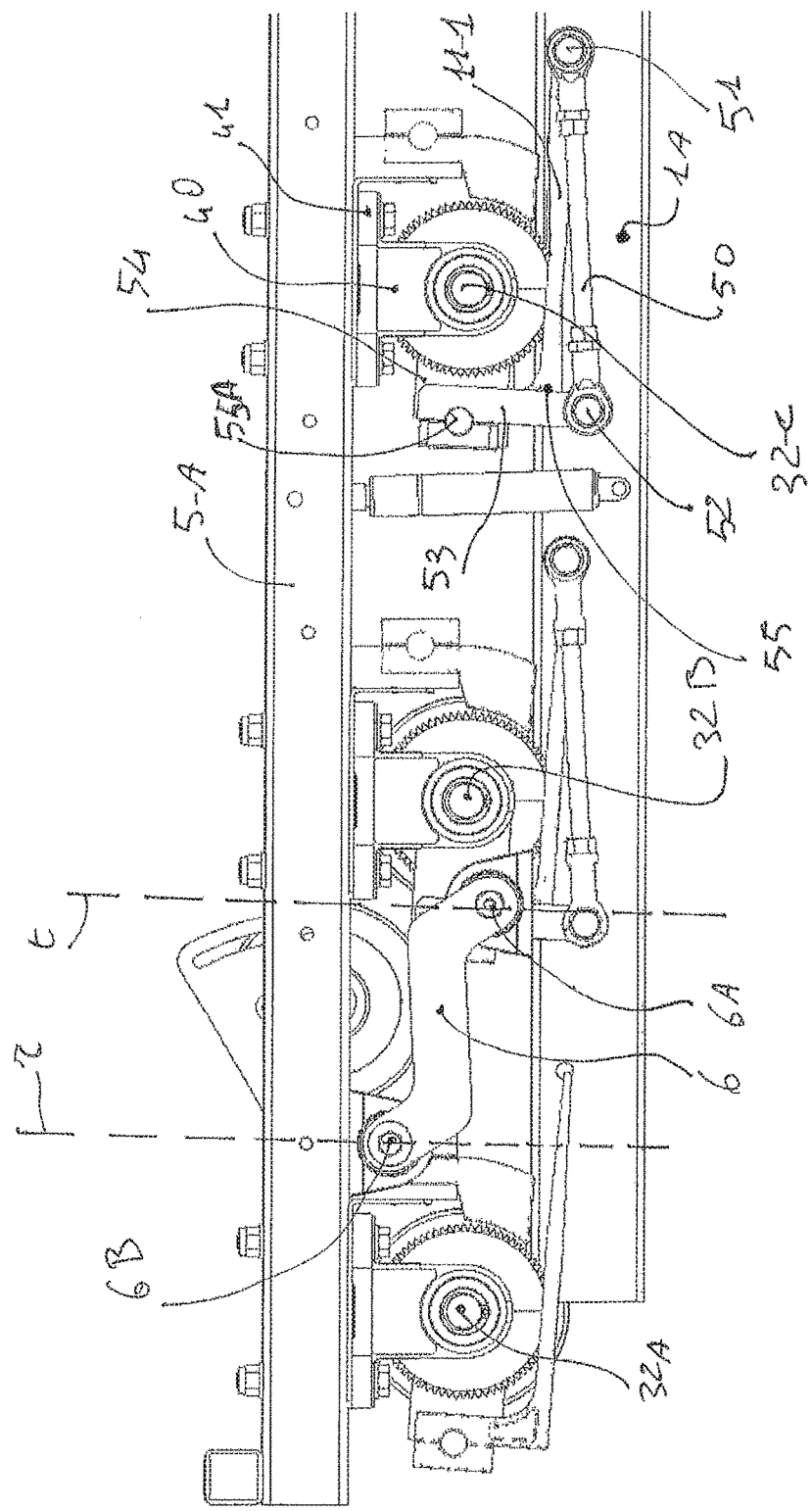

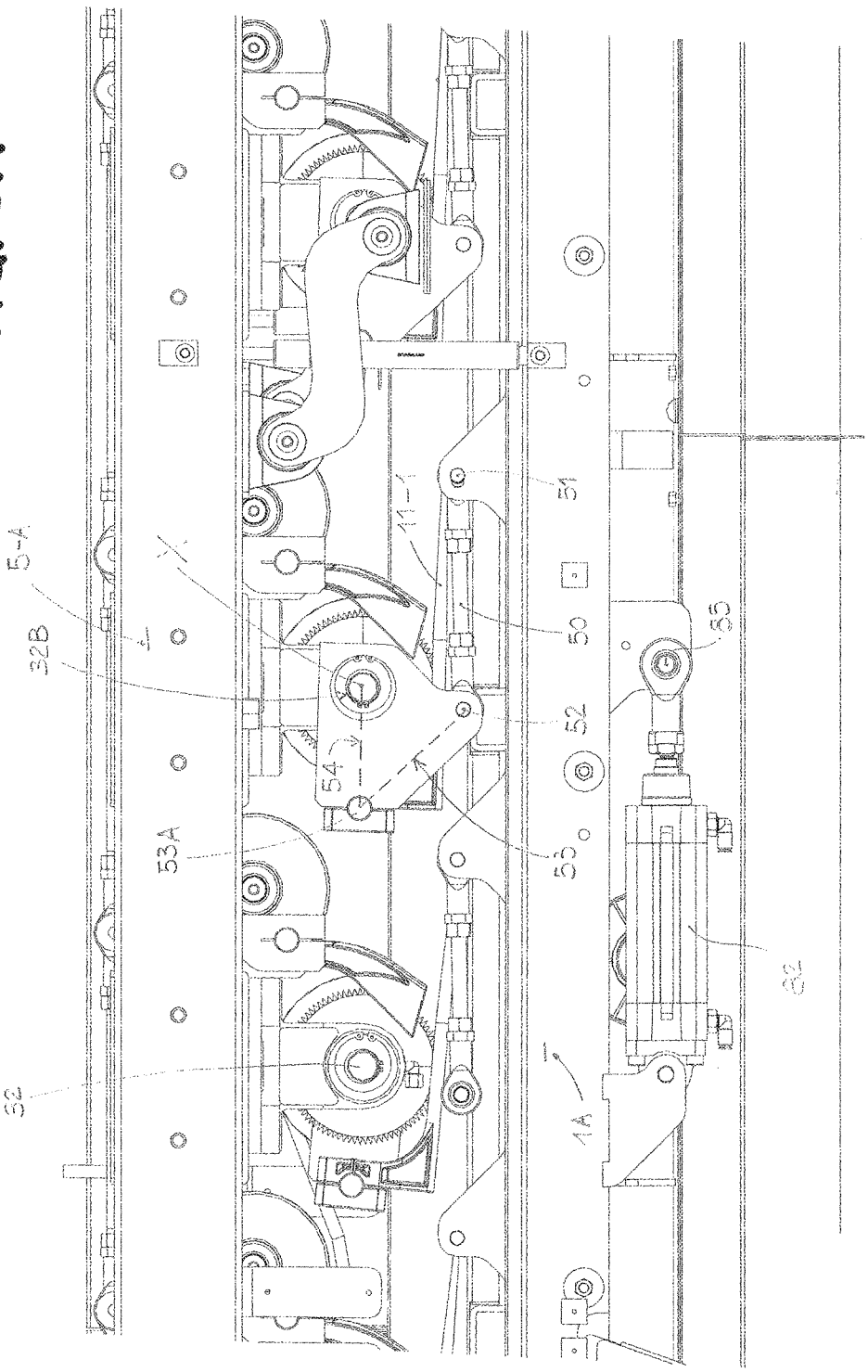

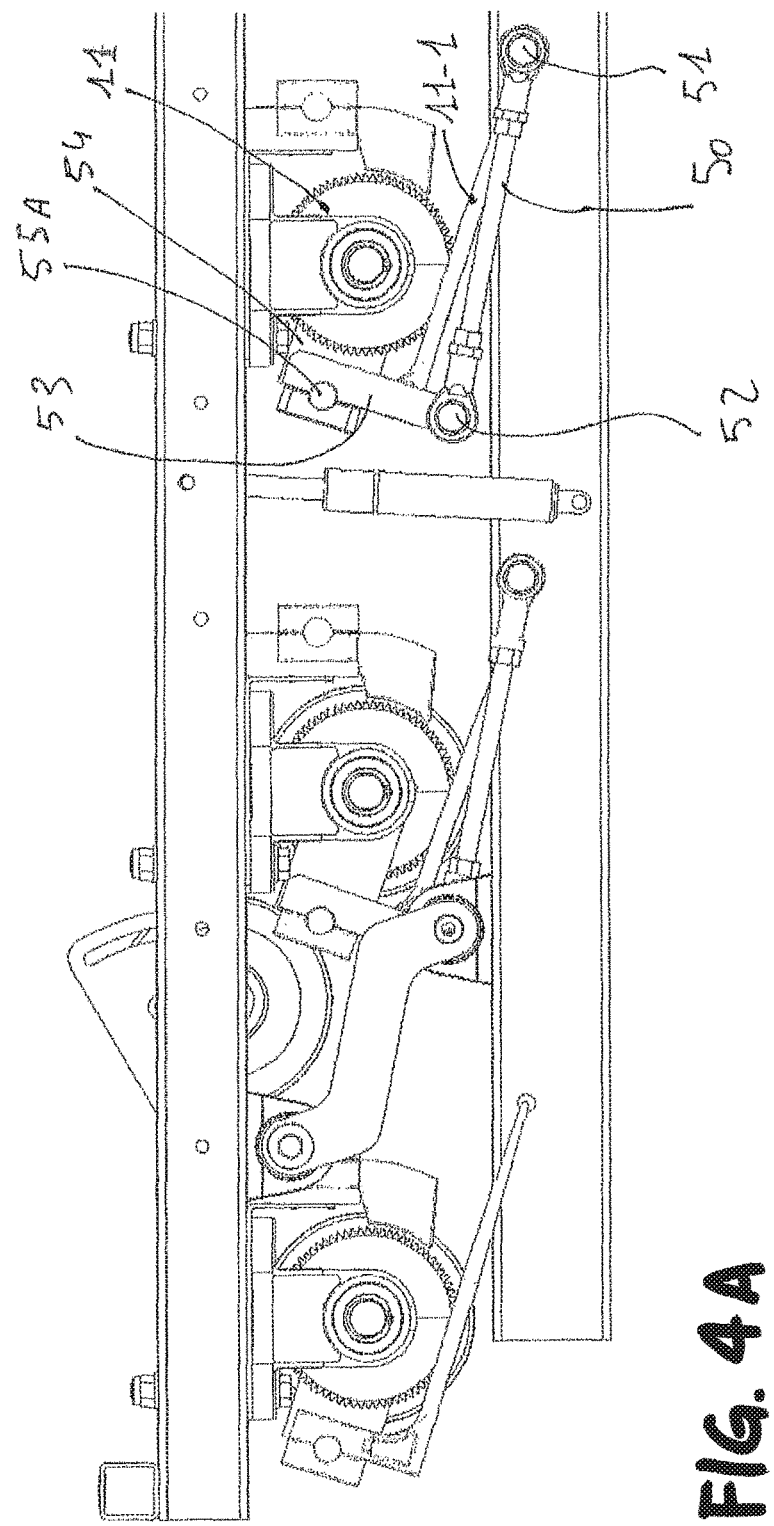

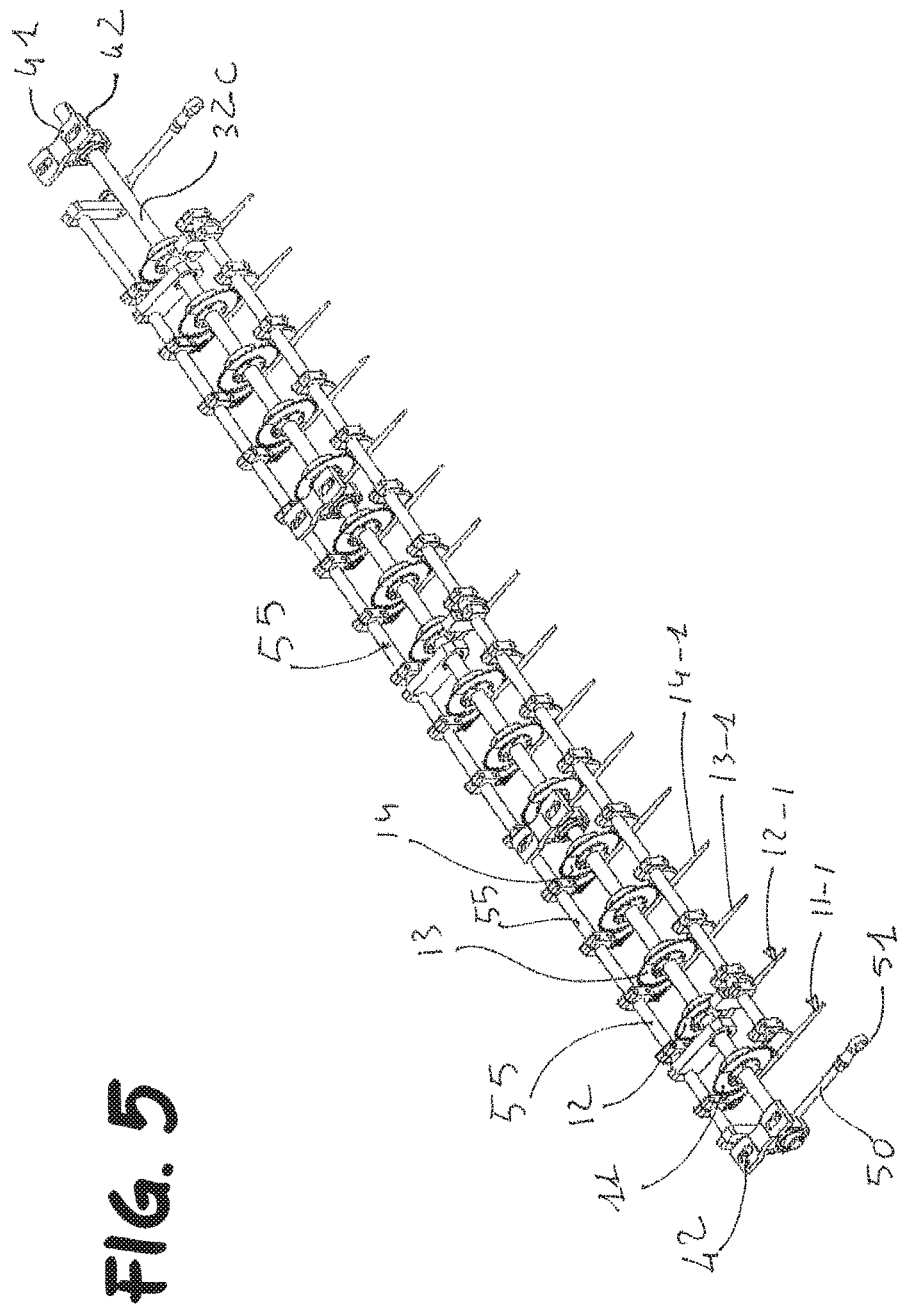

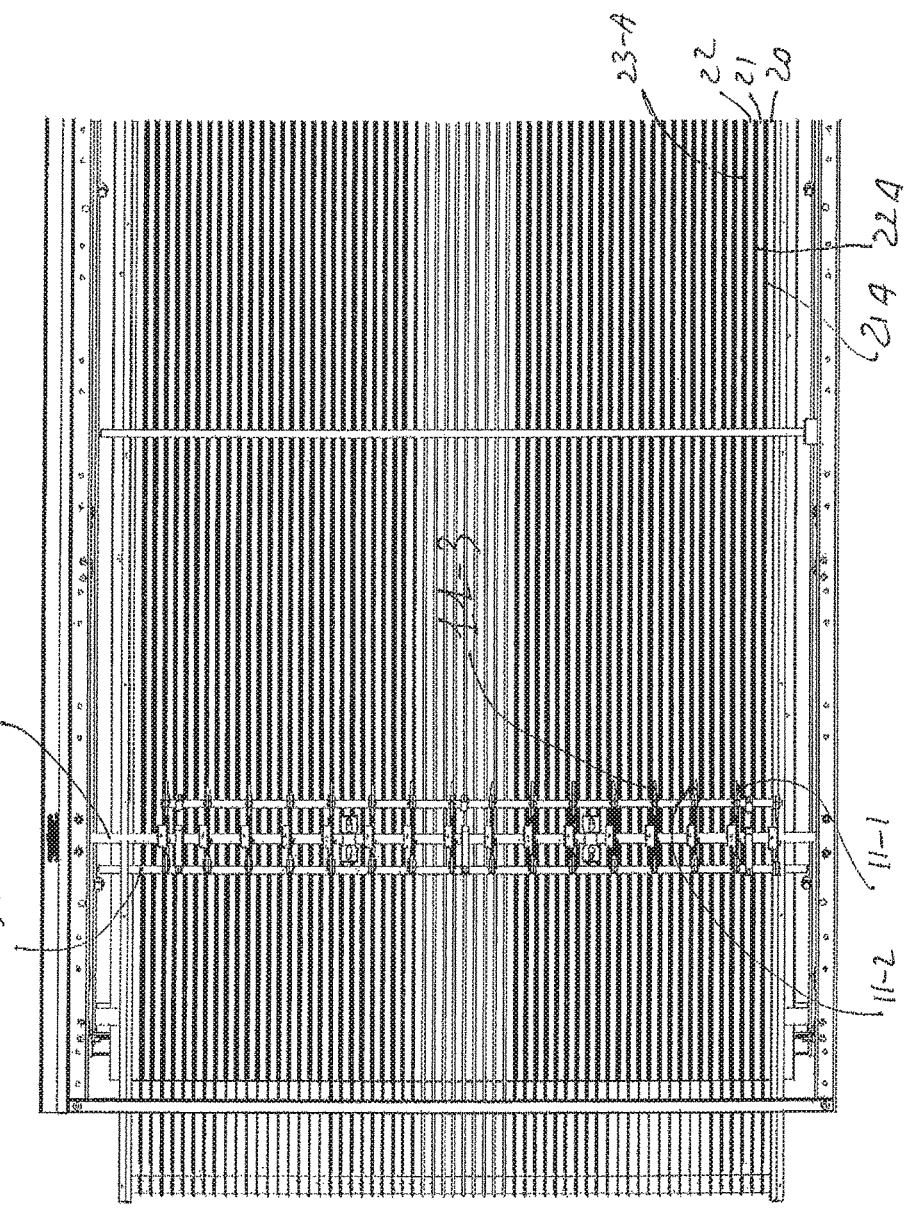

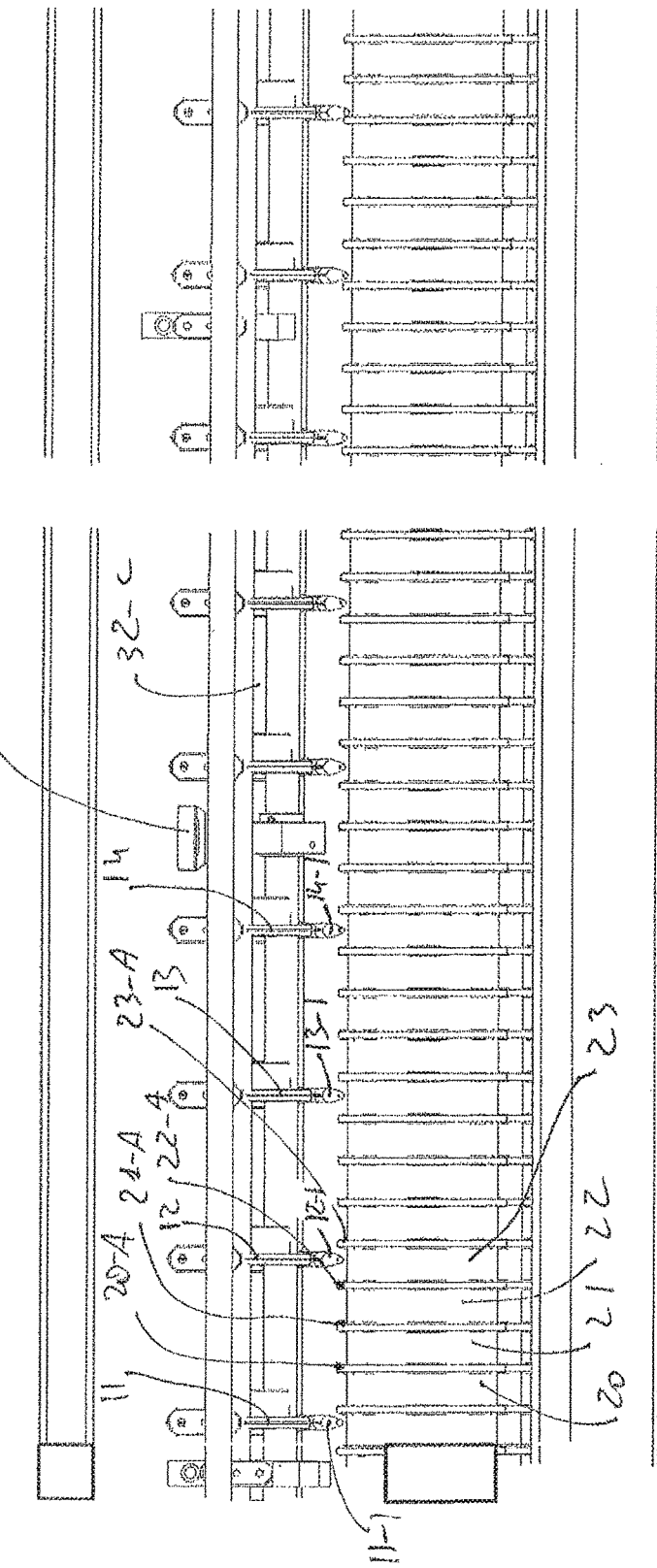

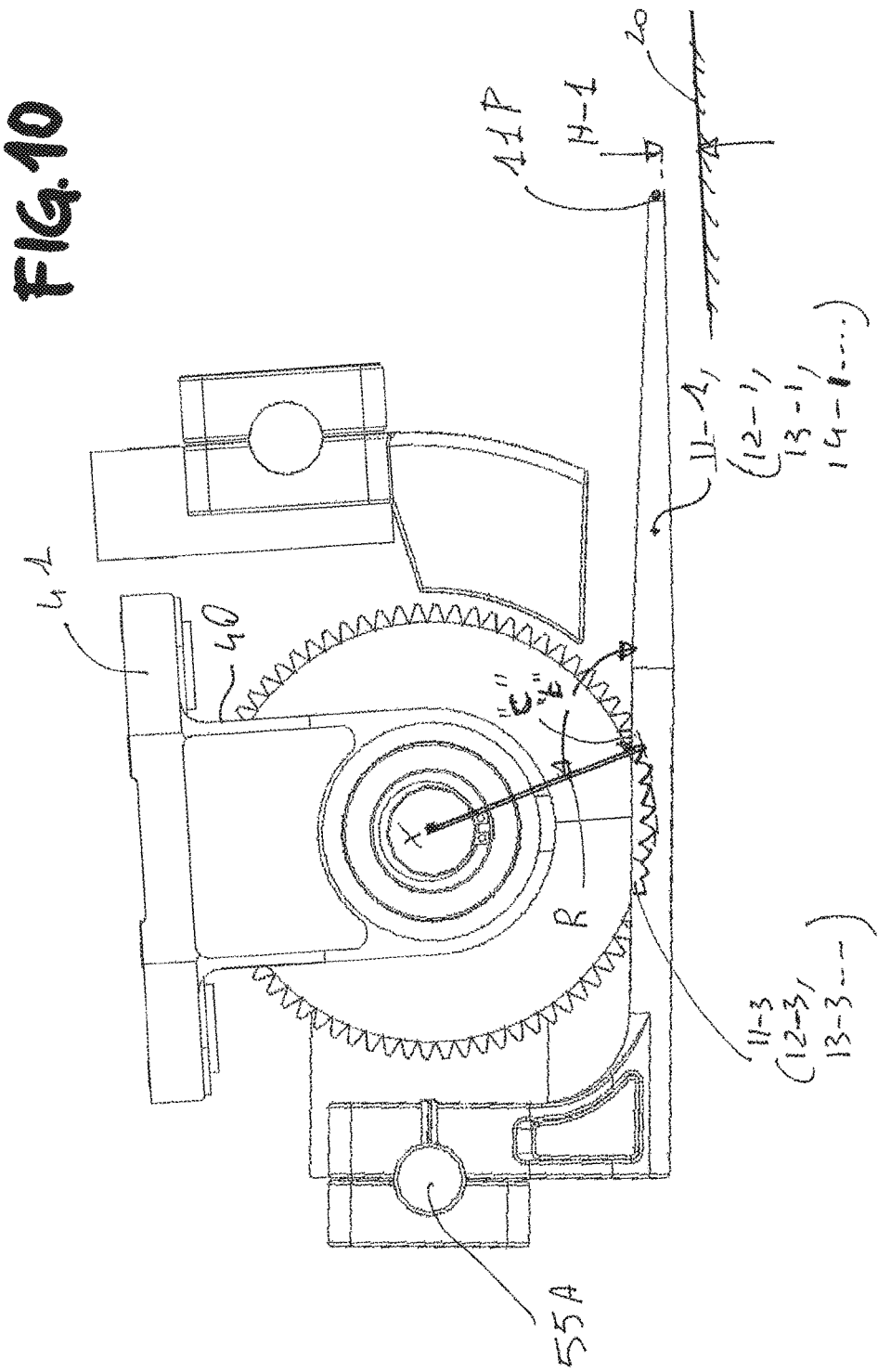

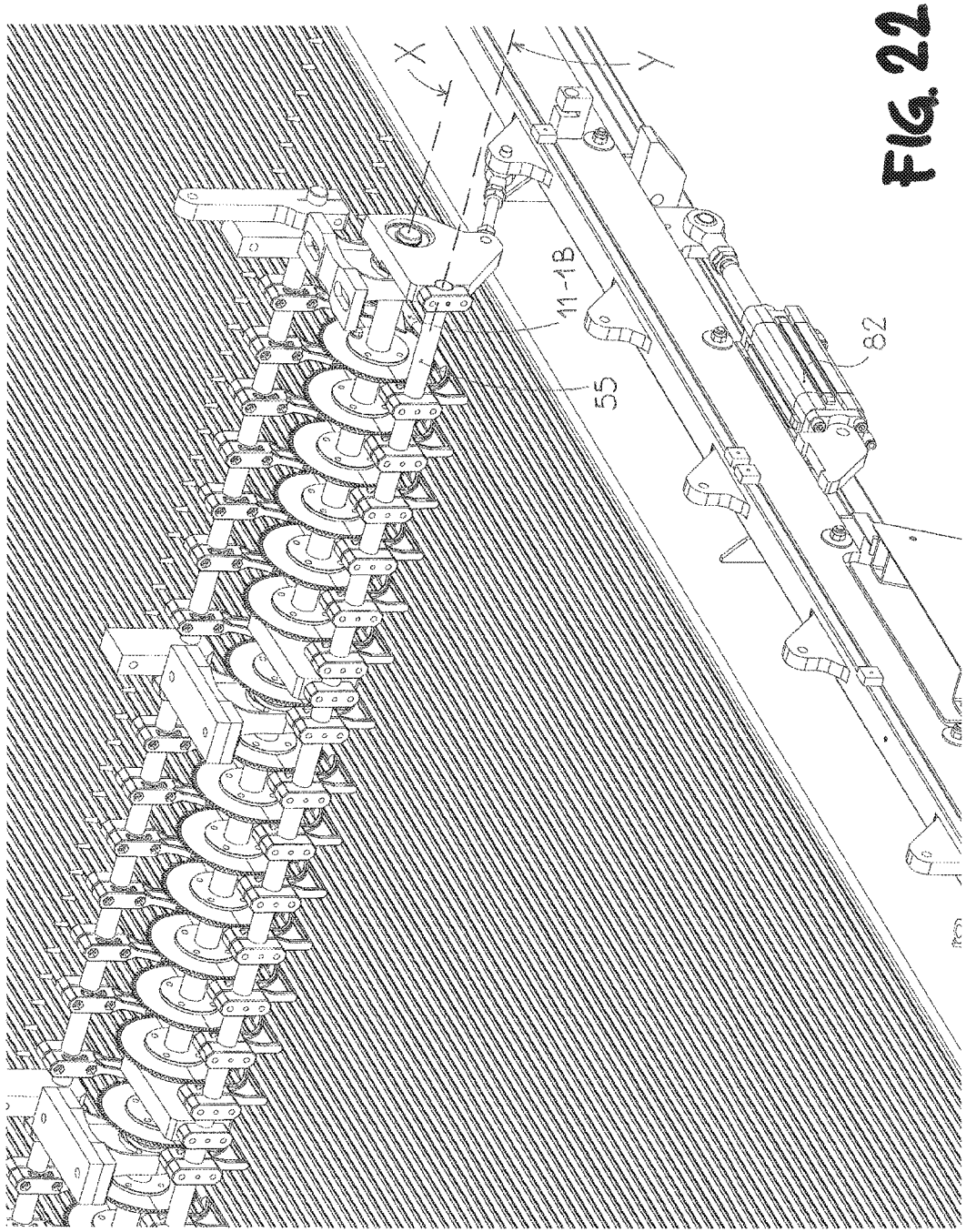

APPARATUS FOR THE SEPARATION OF AGRICULTURAL PRODUCTS

The present invention refers to an improved apparatus for the separation of agricultural or vegetable products that are joined to each other through relative connecting appendages, such as petioles, stems, stalks, etc., as for example cherries, small clusters of cherry tomatoes, etc., that have been previously picked and that normally arrive joined in small bunches or that are still connected to each other through the relative stems, in particular in the case of cherries.

In particular, the present invention refers to a specific improvement of the apparatus previously described in patent (application) PCT/IB2013/054267, priority 9 Jul. 2012, by the same applicant, now U.S. Pat. No. 9,357,799.

As regards the description of the apparatus described below, and the reasons for the related invention, for the sake of brevity and clarity we refer directly to said patent.

Although the apparatus described therein has proved to be efficient and perfectly suitable for its intended purpose, it has been observed that, in actual operation, a previously unforeseen operating condition may arise with considerable frequency; this unforeseen operating condition consists in the fact that it is occasionally necessary to process, i.e. to select and separate, by hand and not mechanically, a given load of cherries, either because they are very ripe, or because they have special characteristics pertaining to the size or density of the bunches, etc.

As these particular cherries cannot be advantageously processed in an apparatus such as the one described in the previous patent, they must be selected separated by hand in an entirely conventional manner.

However, in a large plant for the processing of freshly picked cherries to be distributed in large quantities, the actual situation that normally occurs during harvesting is that large loads of cherries arrive at the same processing plant with variable frequency, where the single loads may consist of types of cherries having widely different characteristics.

In particular, loads of cherries arriving at the plant may be processed by an apparatus according to the above-mentioned invention, alternating with other loads of cherries which, on the contrary, cannot be processed by the same type of apparatus, but require processing by hand.

In any case, all the loads of cherries, regardless of their quality and characteristics, are indifferently poured into a large bin filled with water, and from here a conveyor belt is generally used to transfer and pour them onto the movable table that occupies said surface "S", as it is referred to in the above-mentioned patent.

It is only at this stage that an assessment is made and a decision is finally reached whether the cherries in each load are to be sorted and processed by the machine or by hand. In the first case, the rest of the process is obviously carried out using the apparatus of the above-mentioned patent.

In the second case, on the other hand, the situation is that the cherries, even if they are already lying on said movable table, must be processed by hand.

In this circumstance it is necessary to avoid processing the cherries in the apparatus of the invention described above, whereas that load, or specific loads, of cherries would have to be transferred onto another processing station/apparatus. This sort of operation is obviously expensive in terms of time and resources, requiring not only the deployment of personnel and equipment for the purpose, but also occasionally involving the necessity to keep inactive for certain periods of time personnel that would otherwise be fully, continuously, and therefore more efficiently employed.

As these operations must be maintained at a very high level of efficiency, and therefore of speed, considering the highly competitive context in which they are carried out, it is advantageous that the loads of cherries already placed on the above-mentioned movable table should remain thereon even if the relative cherries should be processed by hand and not by the machine.

However, using the apparatus described above this is impossible, since the apparatus continues to operate, i.e., the relative movable table continues to transport the cherries to the point where the stems are cut, since the latter are intercepted in any case by the relative ramps and are thereafter cut by the rotating blades.

Moreover, it must be taken into account that, if the part of the plant consisting of rotating shafts, respective ramps, respective rotating blades and connected elements could be removed from the table, and particularly from the area above it, then the movable table itself could still be advantageously used as a means of transporting the cherries, and as a means on which the operators could perform their tasks in the conventional manner.

In practice, the same movable table could always be used, with or without said rotating shafts, respective ramps, respective rotating blades and connected elements, regardless of the type of operation to be carried out, i.e. whether mechanical or manual, while the type of process to be carried out could be decided only at the last moment, and would always be performed on the same movable table and therefore without the necessity to transport elsewhere the cherries requiring manual processing.

However, this alternative is evidently related to, and dependent on, the circumstance of not being hampered by the devices listed above, which must therefore be removed and shifted as quickly, entirely and easily as possible out of the way of the passing bunches of cherries, i.e. out of an area which corresponds exactly with the area situated above said movable table, so that manual processing may be carried out safely and easily.

It would therefore be desirable, and is the main purpose of the present invention, to manufacture a type of apparatus, suitable for cutting the stems of agricultural products that are joined in bunches, that is multifunctional with respect to the different types of products to be processed, i.e. one that allows for:
  cutting said stems, at the point where they are joined together, in a mechanical and fully automatic manner, or
  using the unloading and transportation table also as a work surface for manual selection and processing by designated operators, according to the conventional methods.

This objective is achieved through an apparatus built and operating in accordance with the accompanying claims.

Characteristics and advantages of the invention will be evident from the following description, given by way of example and without limitations, with reference to the enclosed drawings, wherein:

FIGS. 2, 3 and 4 illustrate respective schematic and enlarged views, similar to FIG. 1, of respective operating arrangements of an individual cutting module of an apparatus according to the invention;

FIGS. 2A, 3A and 4A illustrate respective views in lateral plane projection of a portion of an apparatus according to the invention, corresponding respectively to the arrangements of FIGS. 2, 3 and 4;

FIG. 5 illustrates a simplified perspective view from above of a portion of the apparatus shown in FIG. 1, seen from a point ahead of the axis of rotation of the rotating blades;

FIG. 8 illustrates a plane view from above of the portion of the apparatus of FIGS. 5-7A;

FIG. 9 illustrates a front plane view of the apparatus of FIGS. 5-7A;

FIG. 10 illustrates an aligned lateral plane view of a detail of the apparatus of the above FIGS. 5-7A;

Figure 4:
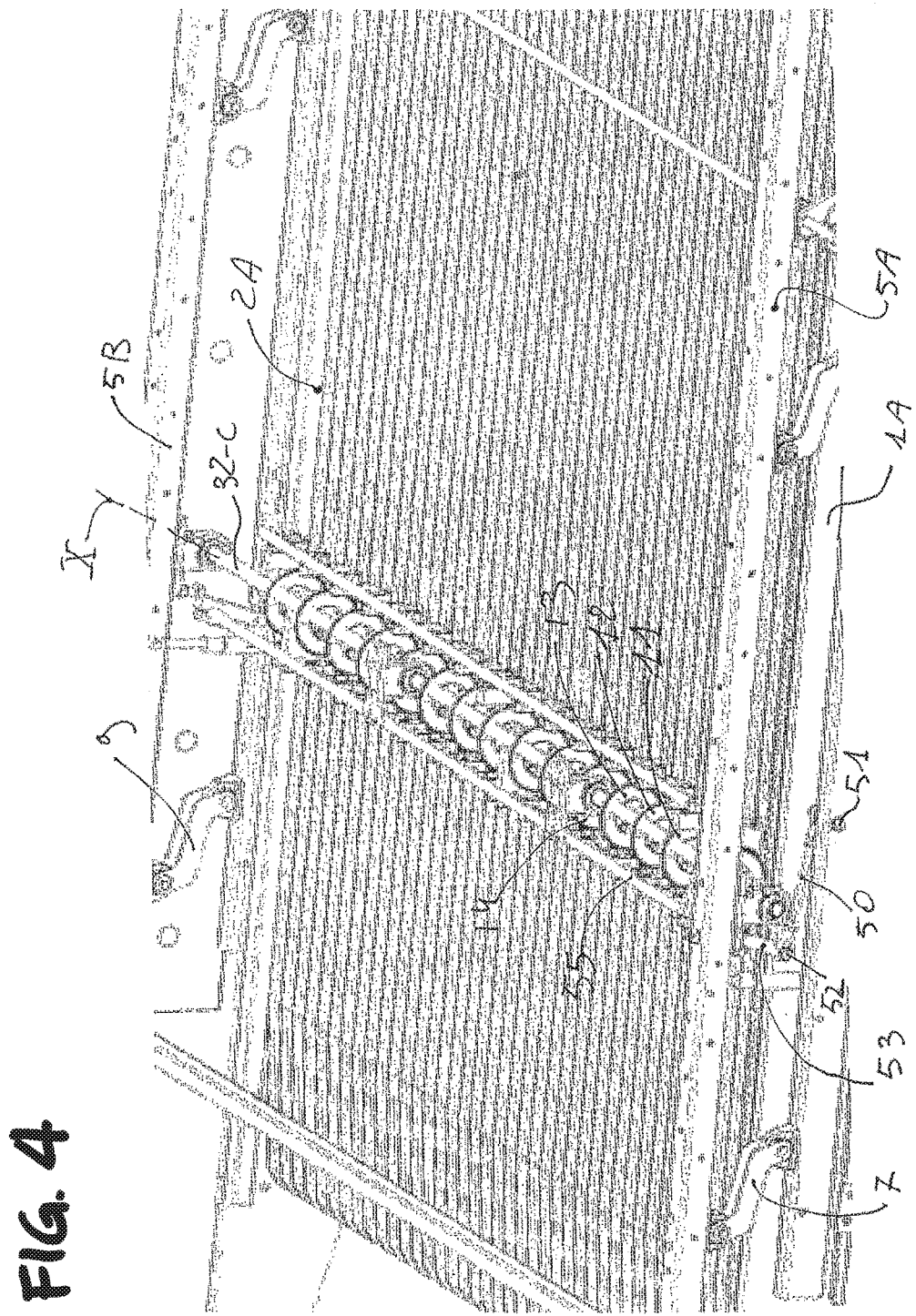
Figure 12:
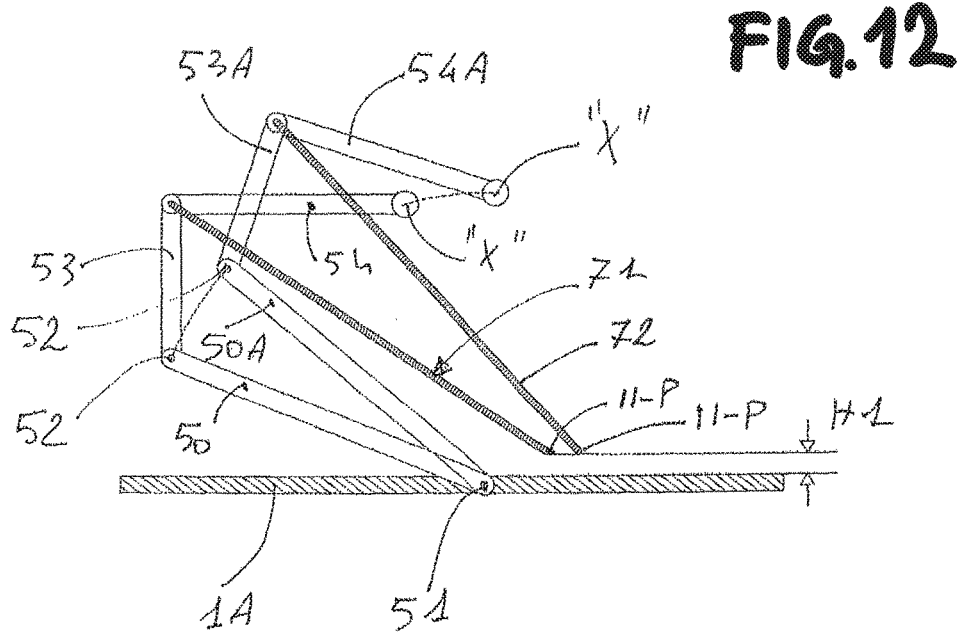
Figure 13:
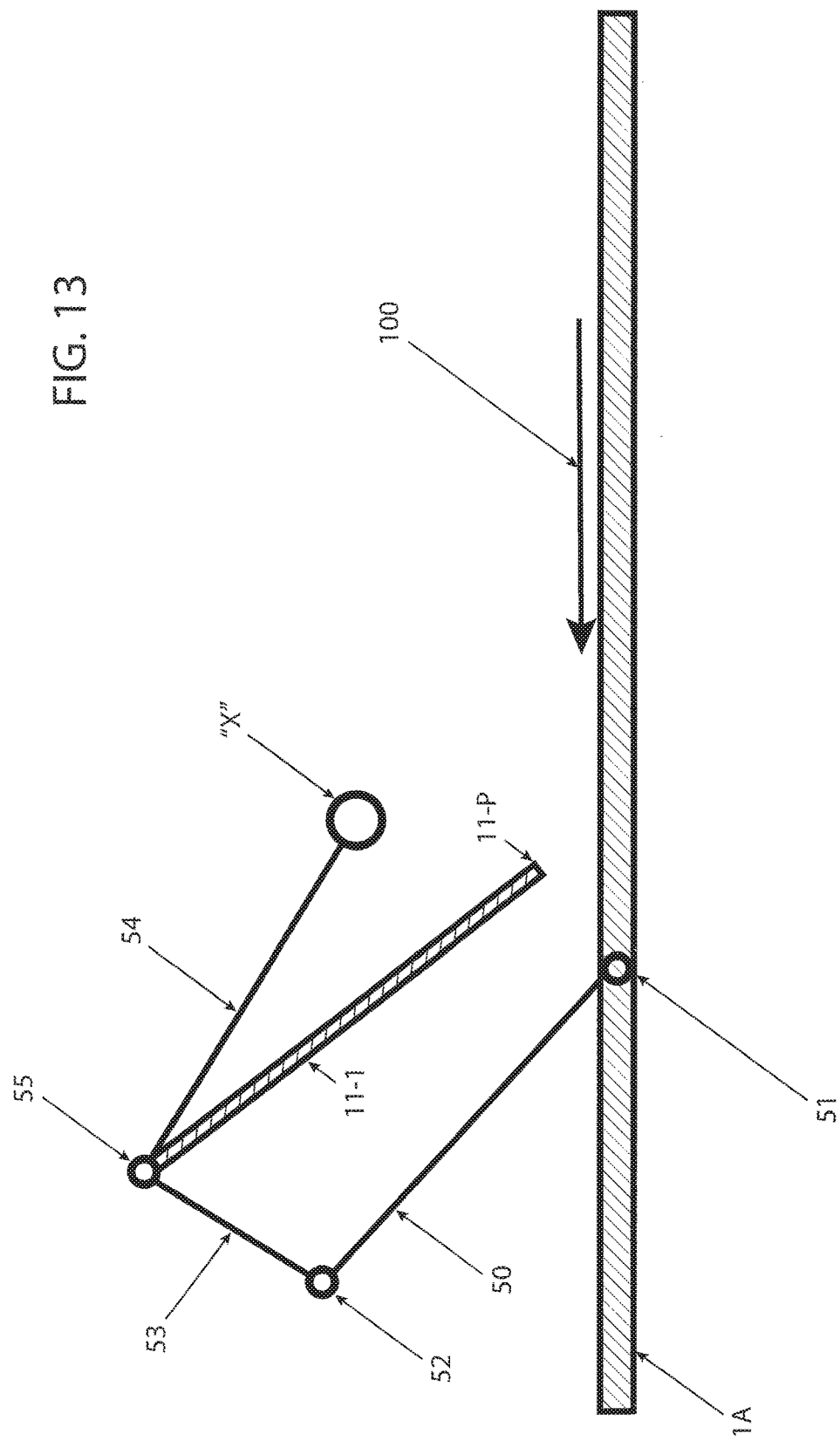
Figure 14:
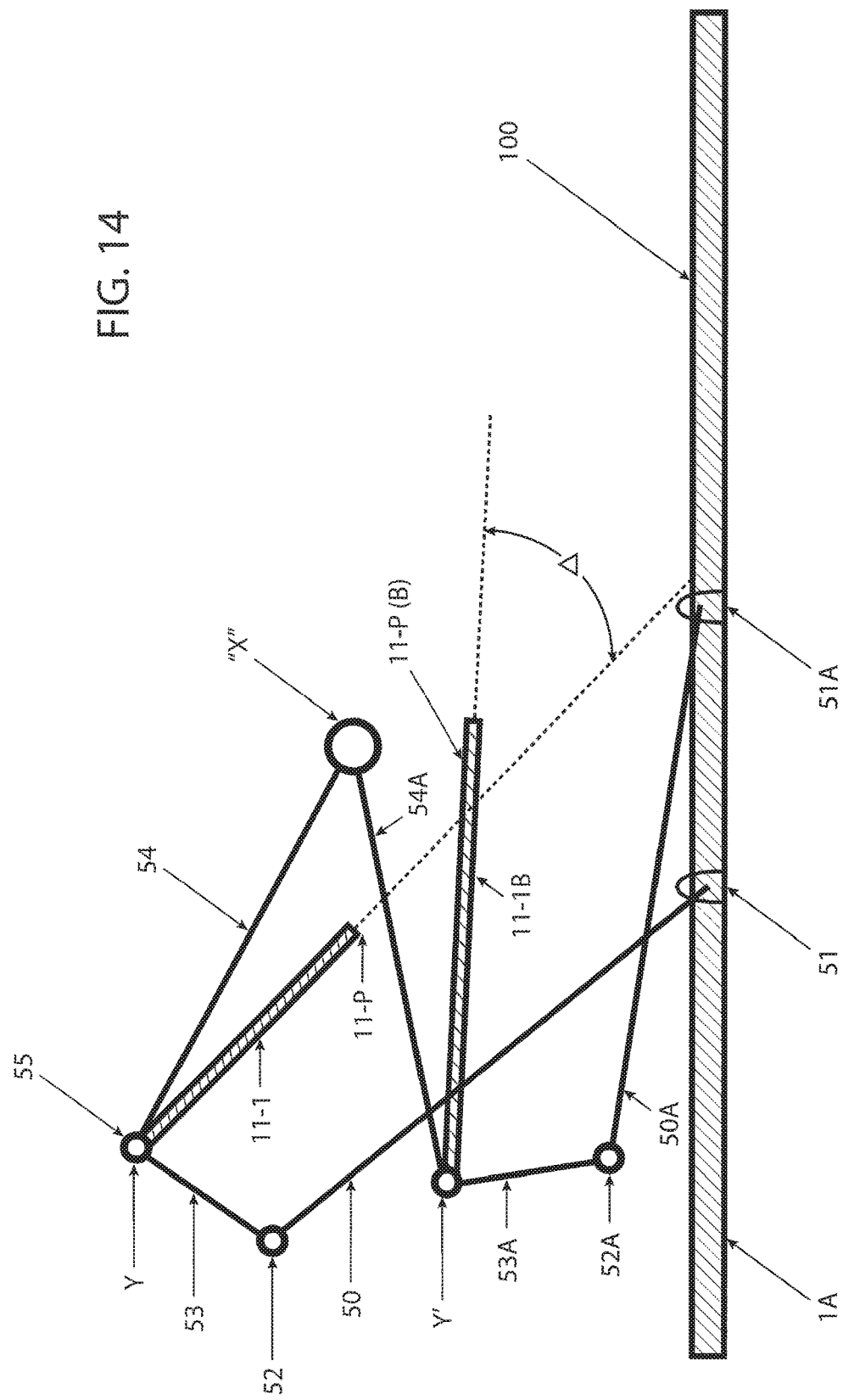
Figure 15:
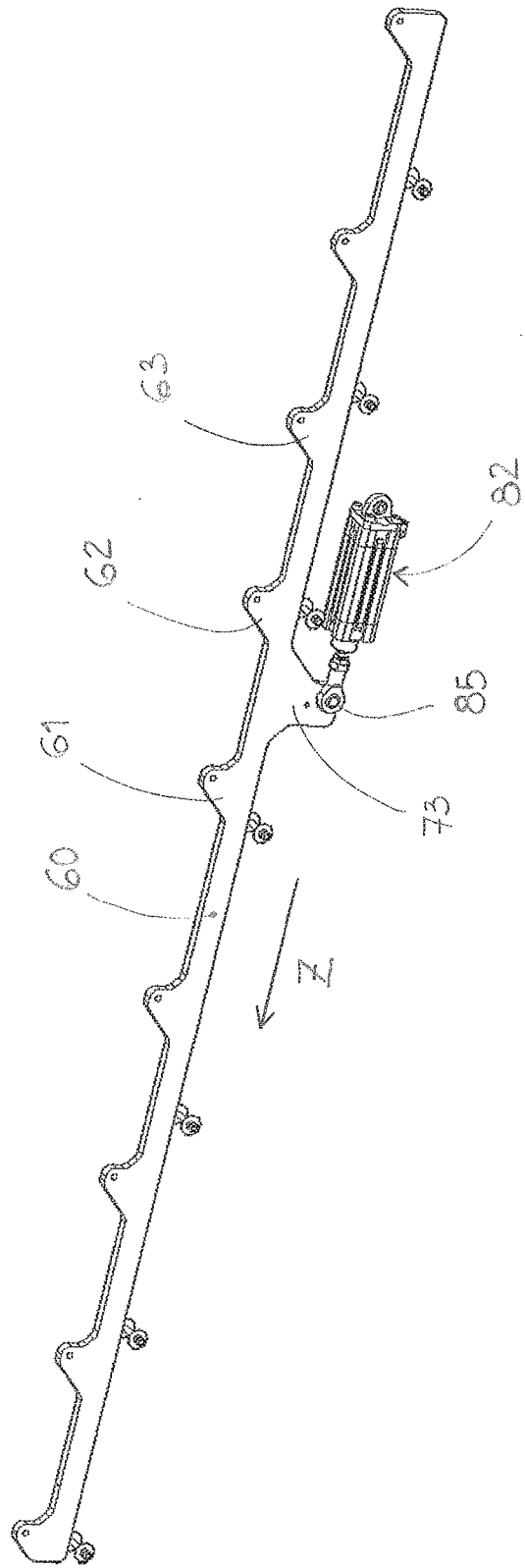
Figure 16:
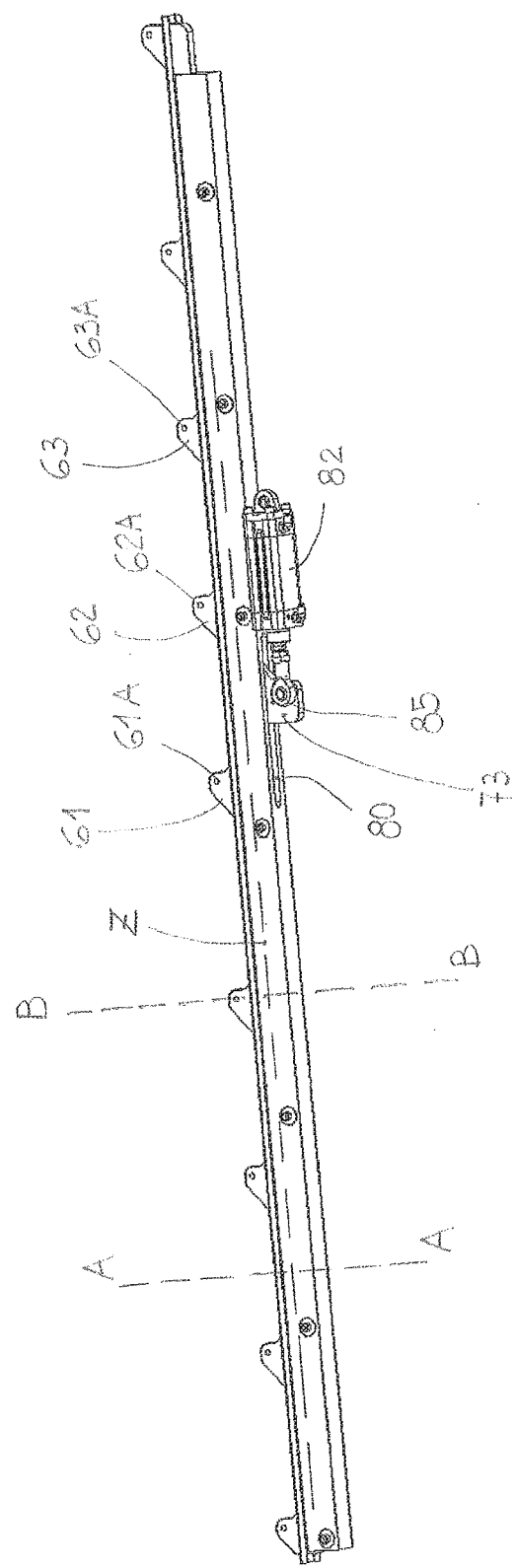
Figure 17:
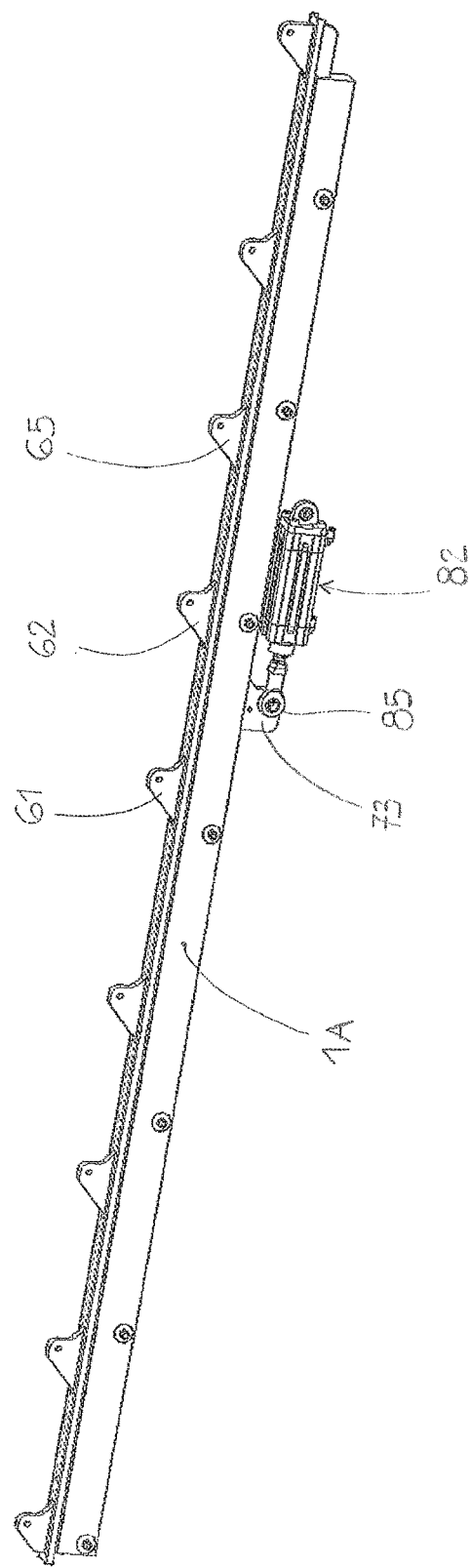
Figure 18:
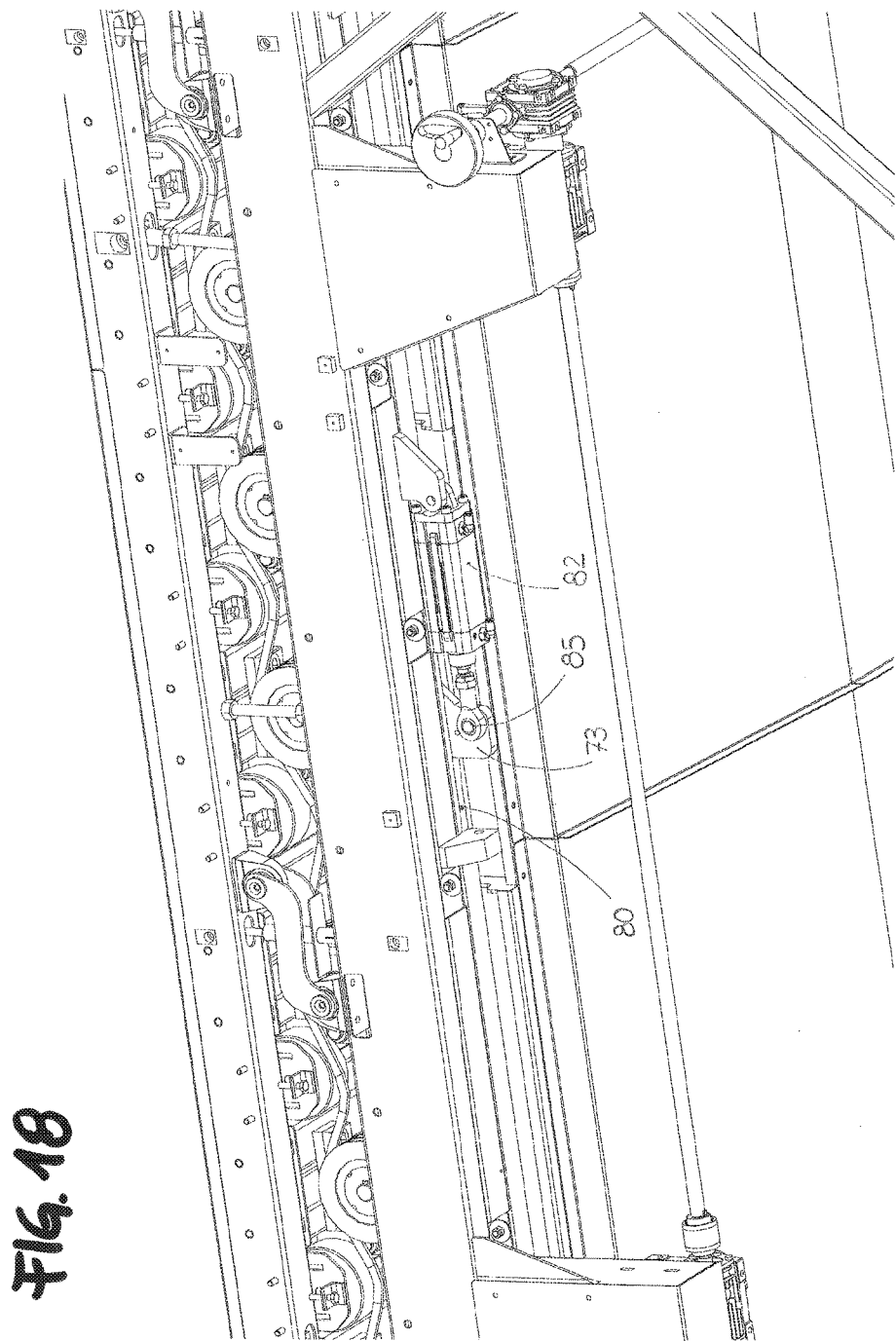
Figure 19:
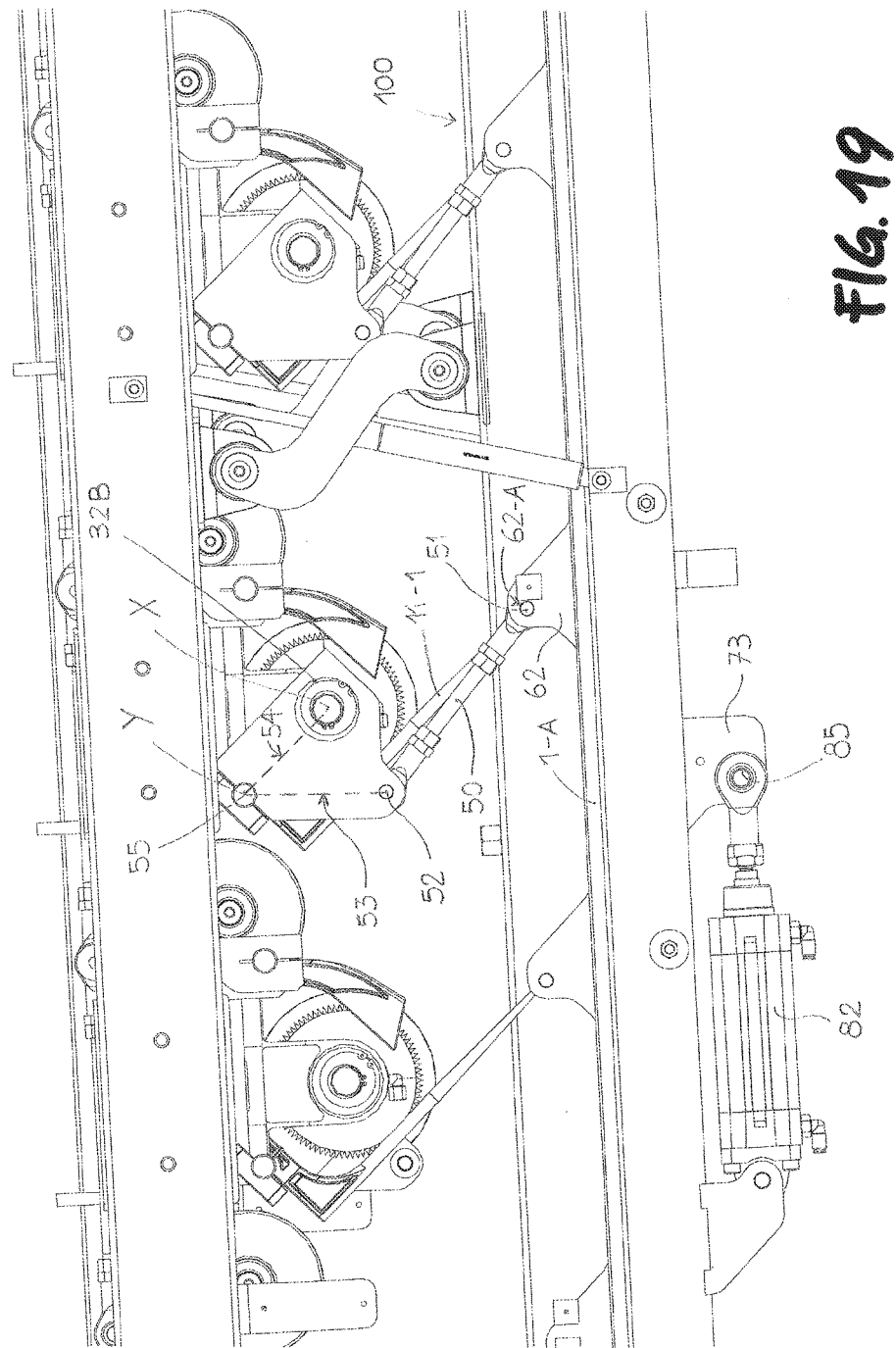
Figure 20:
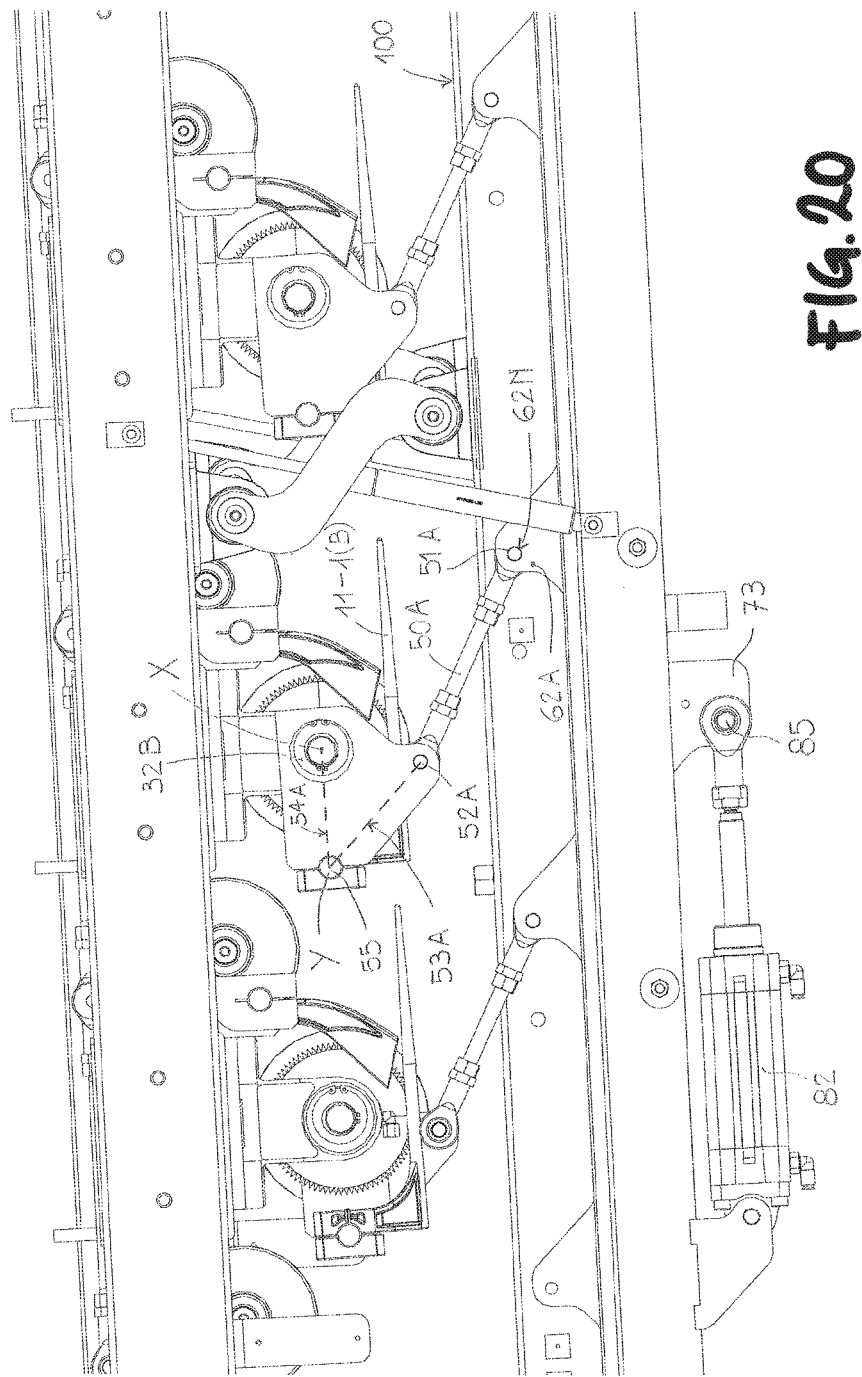
Figure 21:
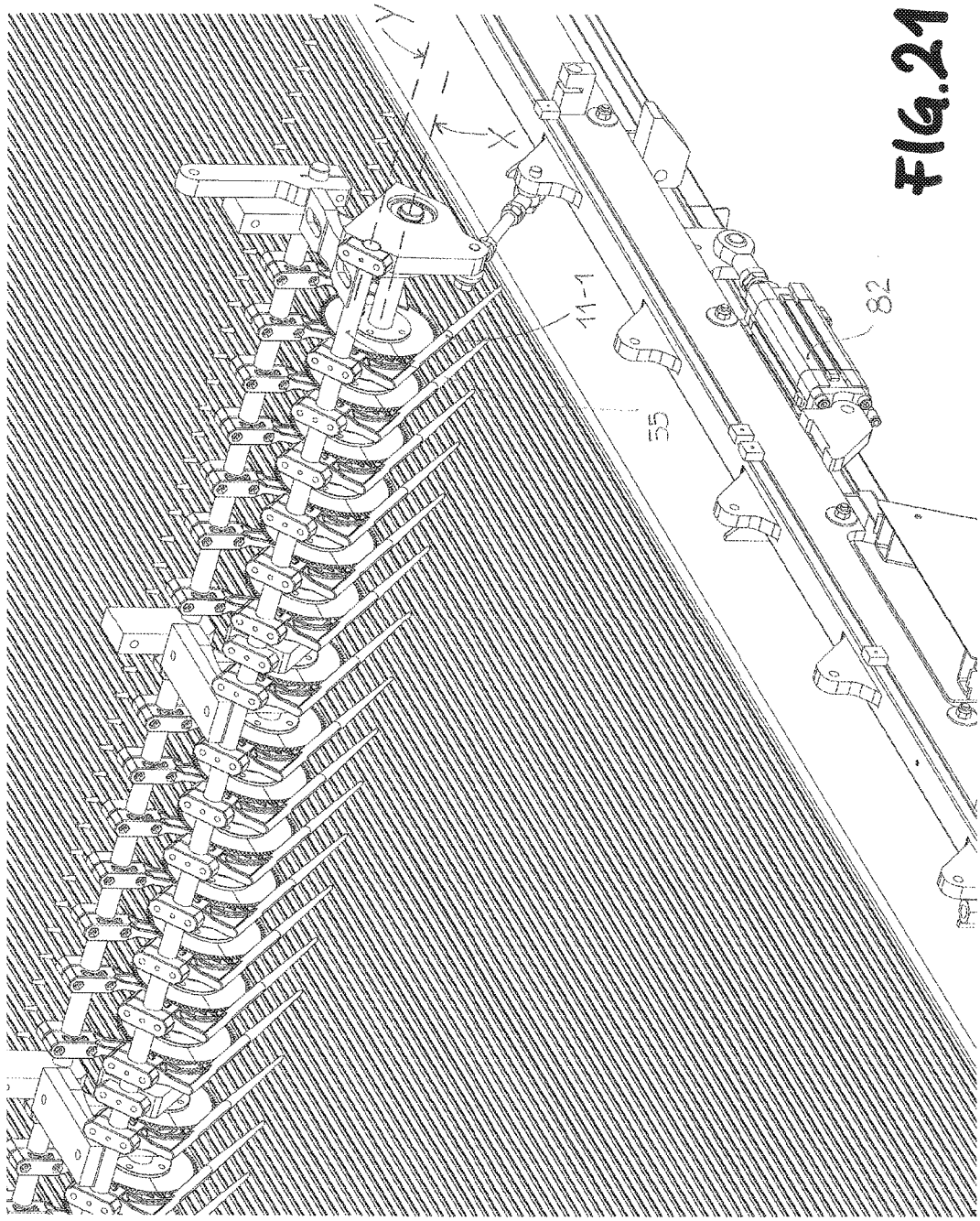

FIG. 12 illustrates a simplified geometrical schematic diagram of the basic manner of operation of the invention, as seen in a lateral flat projection, FIG. 13 illustrates the initial simplified schematic diagram of an improved manner of operation of the invention, FIG. 14 illustrates the simplified schematic diagram of FIG. 13 after the improved operating mode has been activated, FIG. 15 illustrates a perspective view of a component of the apparatus operating according to the schematic diagram shown in FIGS. 13 and 14, FIGS. 16 and 17 illustrate a simplified schematic diagram of the component shown in FIG. 15, after its assembly under operating conditions, seen in perspective, respectively from below and above;

FIG. 18 illustrates a perspective view from the side and bottom of a portion of the apparatus equipped with the improvement shown in FIGS. 13-17, FIG. 19 illustrates a view basically similar to FIG. 4A, in which the ramps are still arranged at a slant in their normal operating position, FIG. 20 illustrates a view corresponding to FIG. 19, in which, however, the ramps are lifted from their previous inclination, and are rotated until they reach a more or less horizontal position, FIG. 21 illustrates a perspective view of a portion of the apparatus which generally corresponds to the condition shown in FIG. 19, FIG. 22 illustrates a perspective view of a portion of the apparatus which generally corresponds to the condition shown in FIG. 20.

With reference to the figures, an apparatus for cutting the stems of clusters of vegetable products, in particular cherries, comprises in general:
- a support structure with a frame with two parallel horizontal side members 1A, 1B defining between them a substantially flat surface "S", typically rectangular; said surface "S" is a purely geometrical definition, and does not identify any material means, as will become clear in the description;
- a plurality of cutting modules 2A, 2B, 2C, 2D, 2E . . . , that are substantially identical to each other and each provided with a common rotating shaft 32A, 32B, 32C, 32D, 32E . . . ; said rotating shafts being parallel to each other and arranged above said surface "S", and therefore are in succession, so as to be able to intercept practically all of the clusters of products carried by the underlying table.

Said cutting modules are identical and therefore, for the sake of simplicity, only one of them will be described hereafter, for example module 2C (see FIG. 2), it being understood that the relative explanation extends to all the other modules.

Figure 3:
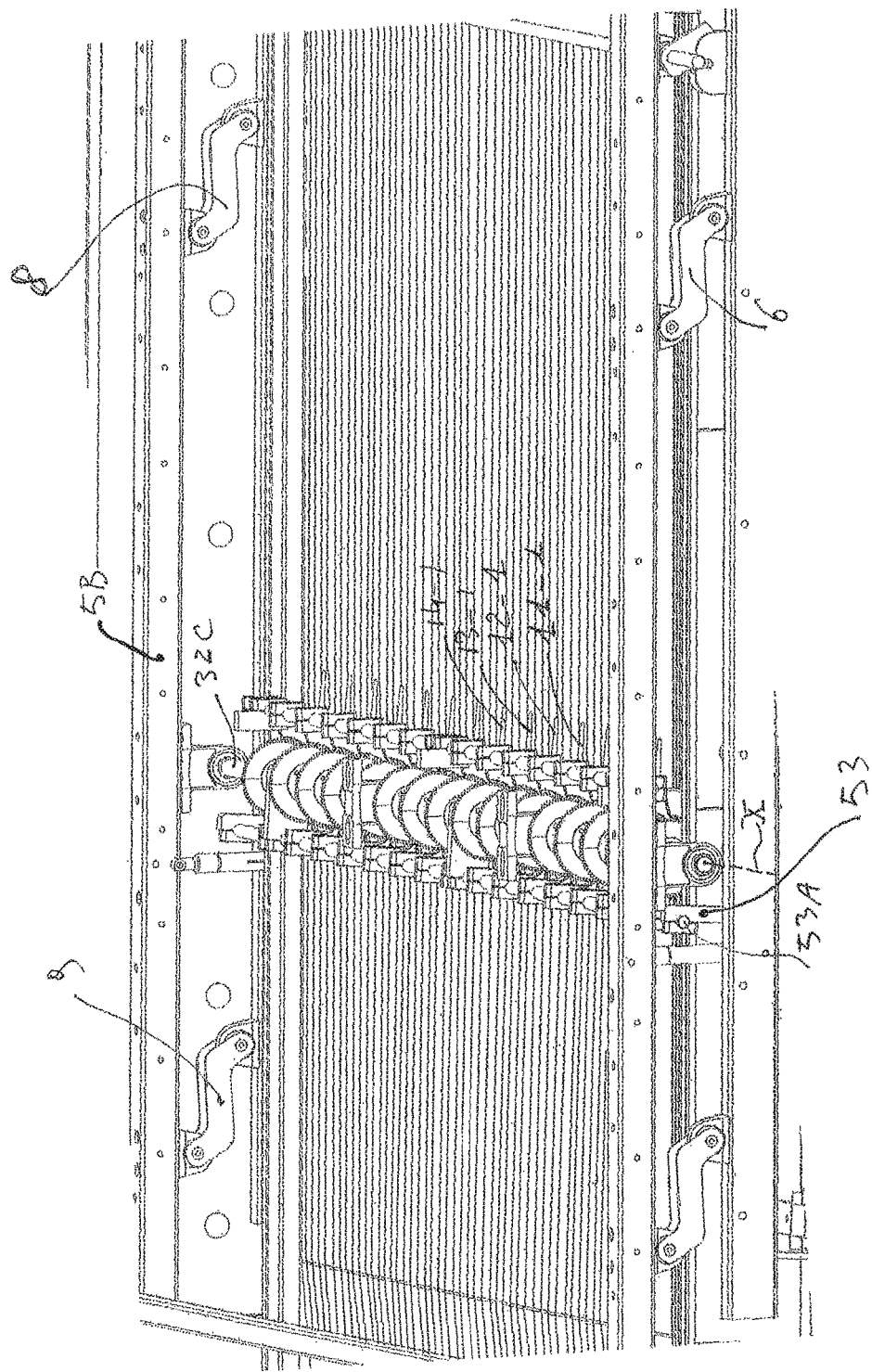

For simplicity of description and manufacture, said apparatus is basically symmetrical with respect to a vertical plane "P" (See FIG. 8 and, schematically, also FIG. 3), orthogonal to said rotating shafts 32A, 32B, 32C . . . and passing through the median line of said surface "S" with reference to said pairs of fixed opposing side members 1A, 1B.

In general, the description and the claims will refer sometime to a single element, and sometime to a number of similar elements; since said cutting modules are substantially similar, and since each cutting module includes a plurality of rotating blades and relative associated elements, in particular the relative ramps and the means suitable to modify their position, that are similar or identical, it remains likewise understood that the reference to a single one of such modules, or to a single one of said means or blades extends successively and obviously to all the other modules and other means or blades, as is shown clearly in the enclosed figures.

Said rotating shafts are arranged above the conveying means that cover said surface "S", which conveying means are suitable to carry the produce placed on them toward said rotating blades.

Said module 2C is equipped with:
- a plurality of rotating blades 11, 12, 13, 14 . . . , arranged in fixed positions along its length;
- a plurality of positioning ramps 11-1, 12-1, 13-1, 14-1, in which each of said ramps is arranged in a position corresponding to a respective rotating blade;
- said ramps having an elongate shape in the direction of movement of said conveying means and noticeably flattened and oriented vertically;
- the respective upper edge of which is oriented downward toward said conveying means, with an inclination such that the height of said edges increases in the direction of the respective blade, arranged above said conveying means;
- so that the clusters of produce placed on said conveying means are carried toward said ramps whose upper edge set at an acute angle, respectively 11-2. 12-2, 13-2 . . . (FIG. 10), determines the point of intersection of the stems of each cluster that is intercepted by the relative blade.

As regards said FIG. 10, it must be understood that, this FIG. 10 being a vertical and lateral plane representation, said upper edges 12-2, 13-2 . . . are not explicitly shown for the obvious reason that they are covered, and therefore hidden, by the first edge, view 11-2.

To be precise, each ramp is aligned with the respective blade, and is arranged in its lower area; in order to allow the ramp to carry the clusters of produce toward the respective blade, said ramp is provided in its upper part with a respective recess 11-3, 12-3, 13-3, 14-3 of a size suitable to accommodate the relative blade 11, 12, 13, 14 . . . . In this manner, the clusters of vegetable products are carried toward said ramps, each of which intercepts a single cluster at a time and lifts the relative stem, which straddles the ramp, and thus, continuing on its movement, is intercepted by the relative blade and cut at the corresponding point on the respective edge.

Also, as essential element for the functioning of the invention, the transportation and movement of said conveying means is attained as follows:

With reference to FIG. 9, said conveying means include a table formed by a plurality of parallel grooves 20, 21, 22, 23, 24, 25 . . . arranged horizontally and substantially orthogonal to said rotating shafts.

Said grooves are reciprocally separated by respective raised portions 20-A, 21-A, 22-A . . . ; the set of said grooves and relative raised portions is typically formed by a continually moving conveying belt.

This moves in a direction parallel to said grooves 20, 21, 22, 23, 24, 25 and relative raised portions, and thus moves orthogonally to said rotating shafts.

In addition, each ramp is superimposed on a respective groove and is inclined and aligned with respect to the latter, so that the projection of each of said ramps with respect to the relative groove is aligned with the same groove; in particular, the position of the tip 11-P, 12-P, 13-P, 14-P . . . (see FIG. 2) of said ramps is set at an optimal height H1 from the top surface of the respective groove, as shown in FIG. 10.

Since, in fact, most of the vegetable products, in particular cherries, that are joined in one cluster, come to be inside the same groove, it is evident that the operation of cutting the stems is more effective and productive if the cutting blades, and therefore the relative ramps, are centred and aligned within respective ones of said grooves.

In fact, the task of performing the cutting of substantially all the stems relies on the fact of having not only one cutting module, but a plurality of cutting modules 2A, 2B, 2C arranged in succession, one downstream of the next, with respect to the direction of movement of the table formed by said grooves alternated with respective raised portions.

The operation of the apparatus described here is as follows: the various clusters are set down and distributed with known means and manners on said table formed by the various grooves 20, 21, 22, 23, 24, 25 . . . and the relative raised portions 20-A, 20-B, 20-C, 20-D . . . .

With the movement of said conveyor toward said ramps and rotating blades, the products reach the position of said ramps, and due to the dragging movement to which said stems are subjected they are intercepted by respective ramps and are thus naturally captured and lifted, by effect of the dragging movement, up to where they reach the relative rotating blade, which cuts them exactly at the upper edge of the relative ramp.

Thus is achieved a first objective of the invention, which consists of carrying the various clusters to the cutting station without subjecting them to vibrations, shaking, etc., which would naturally damage them.

However, as already mentioned, the situation described above yields optimum results only if the distance of the upper edge of the ramp from the bottom of the adjacent groove is substantially similar to the height of the stem or, more precisely, to a length of the stem such that, considering also the size of the fruit, the knot of the stem positions itself exactly, or almost exactly, at the height of the upper edge of the ramp.

In fact, if this condition does not occur, and if for example the stem is longer, it may happen that the ramp could fail to catch and lift the knot, because the knot positions itself naturally on the ramp itself; in this situation, the blade reaches the stem, and then cuts it in a position far from the knot, which would be decidedly unhelpful and undesirable.

Another serious shortcoming found in similar machines already present and operating on the market, consists of the fact that, although they are built with a plurality of cutting modules, each of which is fairly similar in principle to the cutting modules 2A, 2B, 2C, 2D, 2E . . . of the present invention, these machines require however that, when it is necessary to modify the height or the inclination of the ramps, it is also necessary to operate:

not only one by one the mechanisms/devices that regulate the height of each of said cutting modules, that is, the height of the respective rotation shaft on said table, but also to adjust the devices that modify the inclination of the ramps relative to each rotating shaft of the respective cutting module.

This operation, although straightforward and easy, is still extremely time-consuming from the productive point of view, as it requires interrupting the processing of the products and intervening manually and sequentially on each cutting module.

From the economical point of view, this situation is unacceptable both because it forces a machine shut-down that can sum up to a few hours, which is intolerable when it is necessary to process fresh, delicate and prized produce in very short times, and because of the burden of the maintenance and operating times that must be expended to adjust, one by one, the position of the individual cutting modules.

To overcome these serious disadvantages, the improvements hereunder teach the implementation of such means as make it possible to adjust as desired the height of the ramp over the underlying table (grooves and raised portions), and at the same time to also adjust the height of the relative rotating shaft, so that the relationship between the shaft, and therefore the relative rotating blades, and the relative ramps, is substantially constant or almost so, with such a procedure and means as make it possible to adjust the height of all the cutting modules automatically and all at the same time, in a single operation, so that all the cutting modules are adjusted to a new operating condition.

It is clearly evident that such means and the relative operating procedure allows a dramatic reduction of the times that were previously required to adjust the machine; this is so evident that it will not be specified further.

Figure 1:
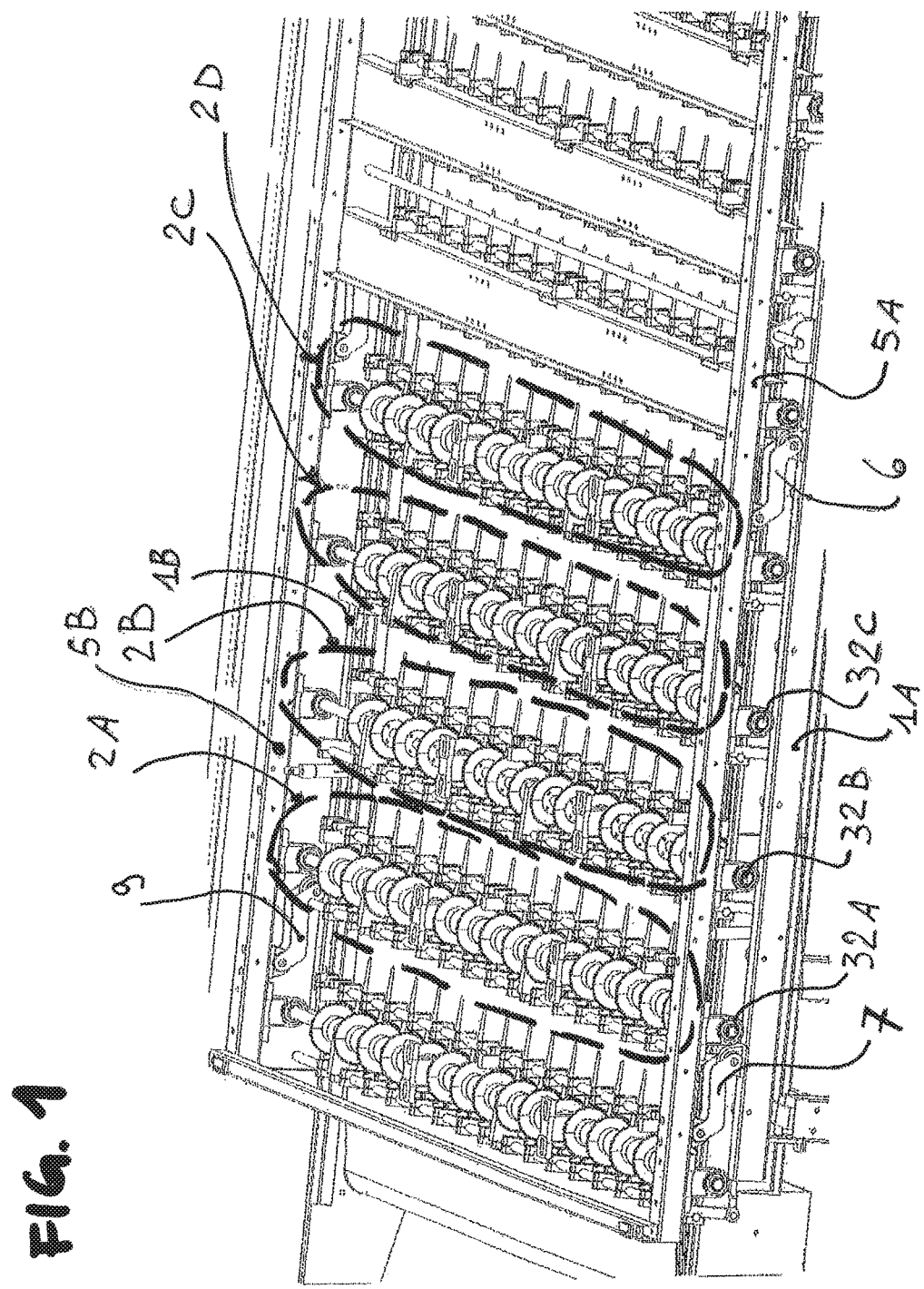
FIG. 1 illustrates an external perspective view from a diagonal position of an apparatus according to the invention.

For the purpose hereof, and referring to the figures, a mobile structure is provided:

formed substantially with a geometry similar to the geometry of said support structure 1A, 1B, and comprising two parallel horizontal side members 5-A, 5-B (see FIGS. 1, 2 and 3), overlying said support structure;

said mobile structure being connected to said fixed structure through a plurality of movable arms, ideally only four arms 6, 7, 8, 9 (FIG. 1);

each of which is connected (FIG. 2A) with one of its ends 6A to a position in said side member 1A, and with the respective other end 6B to a respective position of the side member 5-A belonging to said mobile structure, wherein said ends 6A, 6B relative to a specific arm 6 are arranged on different vertical straight lines r, t.

Thus, if such configuration is replicated, with identical measurements, for both side members of both said mobile structure and said fixed structure, the configuration illustrated in FIG. 1 is obtained.

In practice, each lower side member of the fixed structure is connected to the overlying side member of the mobile structure through two similar pairs of separate arms 6, 7 and 8, 9.

Thus a construction of a "parallelogram" type is provided, so that said mobile structure becomes suitable to move with respect to said fixed structure by means of a movement that will be defined hereunder as "translational motion following a rotating path".

Figure 11:
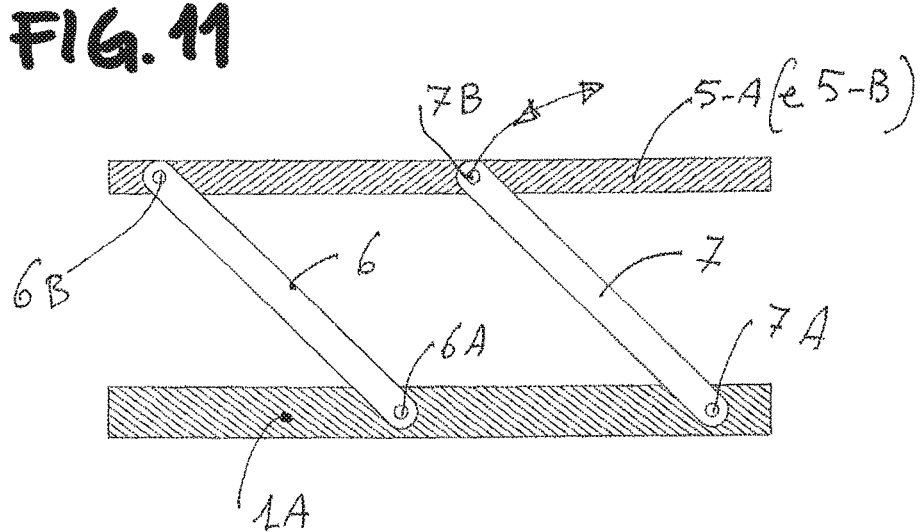
FIG. 11 illustrates a basic schematic diagram of a manner of operation of the invention.

In fact, the mobile structure rotates effectively around predefined points of the fixed structure, due to its being pivoted on said arms 6, 7, 8 and 9, but also due to the "rhombus" shaped structure that is formed:

by to two arms 6, 7 placed substantially on the same vertical plane between a pair of fixed and mobile side members 1A and 5-A;

and by to the portions of the same side members included:

between the pivot points 6A, 7A located on the side member 1A, and similarly between the pivot points 6B, 7B (these are shown in FIG. 11) relative to the side member 5-A.

However, FIG. 11 clearly illustrates the geometrical situation described above, referred to only the side members 1A and 5-A.

We proceed in an entirely similar manner with regard to side members 1B and 5-B, placed on the other side of the same supporting structure.

Keep in mind that, as already mentioned above, for simplicity of description and manufacture said apparatus is basically symmetrical with respect to a vertical plane "P" (see FIG. 8 and, schematically, also FIG. 3), orthogonal to said rotating shafts 32A, 32B, 32C . . . and passing through the median line of said surface "S" with reference to said pairs of fixed opposing side members 1A, 1B.

If the upper structure comprising the side members 5-A and 5-B is lifted (through known means that are not included in the invention), then, as shown schematically in FIG. 11, said same upper side members 5A and 5B are displaced with a translational motion, because they are always parallel to each other, but also with a rotatory motion, because the mobile arms remain hinged on the respective pivot points on the fixed lower structure.

We have thus explained the meaning of the "translational motion following a rotary path" defined above.

Besides, this is the typical movement of any structure in the shape of a parallelogram.

In short, given the configuration illustrated herein, it becomes possible to lift the mobile structure, with respect to the fixed structure, and in particular the side members 5-A, 5-B with a translational motion following a rotatory path. Moreover, said ramps are connected to the two upper side members 5-A and 5-B of the upper mobile structure, so that its lifting also automatically generates the partial lifting of the relative ramps, however without having the position of the respective points increasing or decreasing its vertical distance from the underlying groove, although it may happen that the horizontal position of the same points is modified.

The manner of this connection is explained below.

Naturally, it becomes necessary that the lifting or lowering of the ramps does not cause any problem with the respective blades, which must not be brought to interfere with the ramps themselves, and in any case the reciprocal distance and geometry of the ramp and the respective blade must be respected.

As a result, the axes "X" of the rotating shafts must also be made integral, in the same sense just explained, with said side members.

Figure 6:
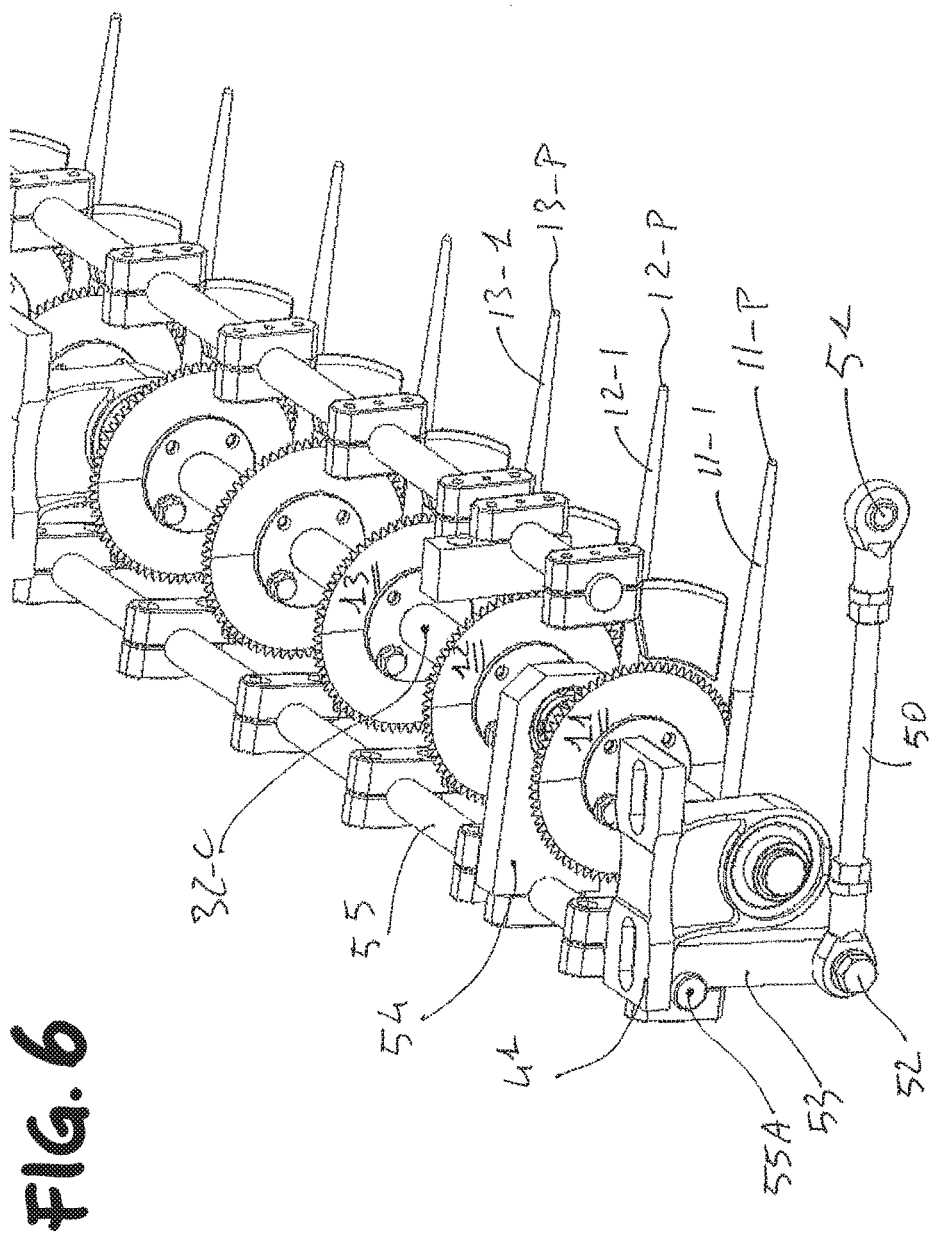
FIG. 6 illustrates a view similar to FIG. 5, but with a single enlarged portion and from a viewpoint nearer to the axis of rotation of the rotating blades.
Figure 7:
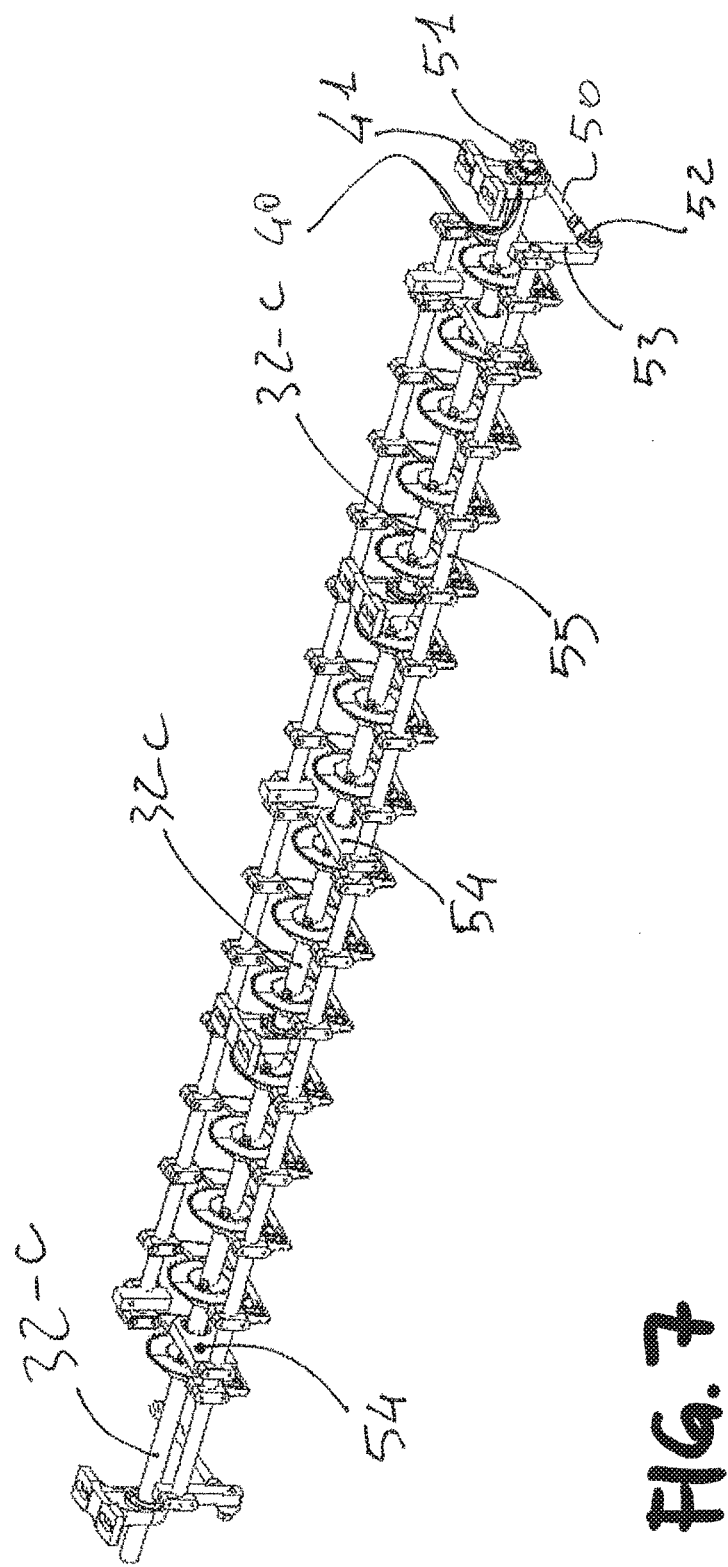
FIG. 7 illustrates a view of the portion of FIG. 5, seen in a diagonal perspective from above but from a viewpoint behind the axis of rotation of the rotating blades.

For this purpose, and with reference to FIGS. 2A, 3A and 4A, said shafts 32A, 32B, 32C, 32D, 32E, . . . are mounted on the two upper side members 5-A and 5-B through normal connecting devices, here represented (FIGS. 6, 7, 7A) by two brackets 40, 41 for the shaft 32C.

For what concerns the ramps relative to this cutting module and to said shaft 32C, mechanical connecting means are arranged which comprise, for each cutting module, a connecting pole 50 pivoted, at one end 51, on a fixed position of said support structure, and in effect to the lower side member 1A, and with the other end 52 on a first mechanical linking element 53 secured to an auxiliary shaft 55, which is in turn secured to one or more second mechanical linking elements 54 (see in particular FIGS. 7 an 7A) connected to the respective rotating shaft 32-C in a manner that will be explained hereunder.

As will be explained below in greater detail, the position of said supporting structure, onto which said end 51 is secured, may be either fixed or movable; however, these different types of arrangement, and the reasons for either, are explained in detail further down.

Figure 7A:
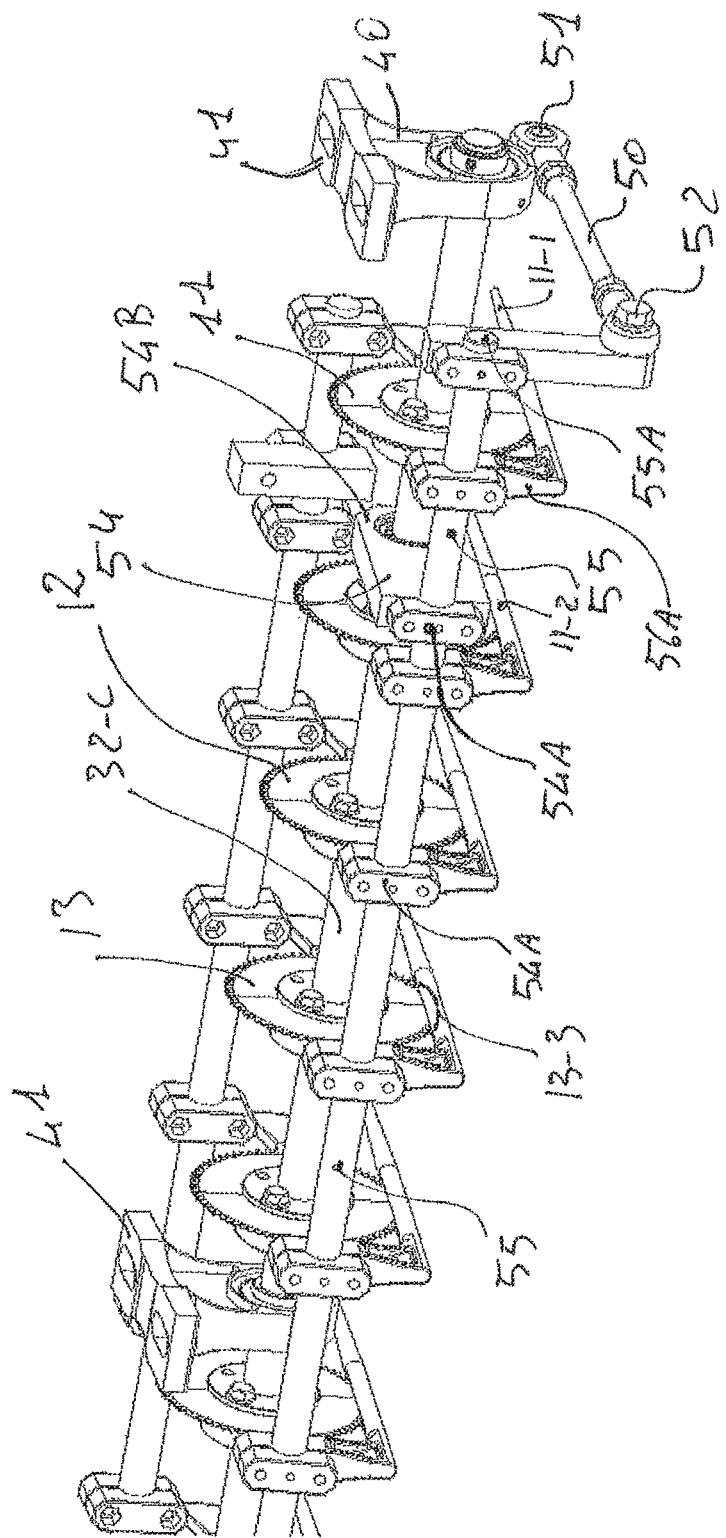
FIG. 7A shows an enlargement of a lateral part of the portion of the apparatus of FIG. 7.

With particular reference to FIGS. 2B, 2C and 7A, said auxiliary shaft 55 is a non-rotating shaft, arranged parallel to the respective rotating shaft 32C, and engaged at one end 55A with the first mechanical connection 53.

The second mechanical linking element 54 is engaged, at one of its ends 54A, with said shaft 55, and at the other end 54B, with said rotating shaft 32C, in a manner that will be described hereunder.

In addition, on the same auxiliary shaft 55 are fastened integral thereto a plurality of arms 56A, 56B, 56C, 56D . . . , all of which support respective ramps 11-1, 12-1, 13-1, 14-1 . . . at one of their respective lower ends.

It should be immediately made clear that said devices connecting said auxiliary shaft 55 to said mechanical linking elements 53 and 54 and to said arms 56A, 56B, 56C, 56D . . . are such that the shaft 55 is non capable of rotating, about its own axis, with respect to said linking elements and ramps, so that ultimately said types of connecting devices translate into through holes arranged on said linking elements 53 and 54 and arms 56A, 56B, 56C, 56D . . . , which through holes are traversed by said same auxiliary shaft 55, which however is not capable of rotating with respect to them.

Finally, the type of connection of said second linking element 54 with said end 54B on the rotating shaft 32C is a rotating connection, naturally in the sense that said shaft 32C traverses in a suitable through hole said end 54B of said second linking element 54, but it can rotate about its own axis, and thus said through hole in said end 54B works as a means that maintains only a definite geometrical position between the linking element 54 itself and the axis of rotation of the shaft 32C, but evidently not between the same linking element 54 and the shaft 32C.

And thus said second linking element 54 is suitable to rotate—only marginally however, as will be explained later—about its respective shaft 32C.

Given the configuration of the elements and devices involved, and comparing together the three FIGS. 2A, 3A and 4A, which show the upper side member 5-A in the two extreme positions of minimum distance and maximum distance, and in an intermediate position, it follows that if the upper side members 5-A and 5-B are lifted, the respective rotating shafts 32-A, 32-B, 32-C are also automatically lifted, and the latter also pull upward the second connecting element 54, which yanks up the respective auxiliary shaft 55, which in turn pulls upward the relative arms 56A, 56B, 56C . . . , which finally also yanks up the relative ramps. However, due to the fact that said shaft 55 is not free but is connected at its end 55A to the first linking element 53, which is connected to said connecting pole 50, which is in turn connected to the lower side member with the pivot point 51, it follows that said mechanical linking elements, and therefore said ramp, are not only lifted but also rotated.

Without entering into a rather complex and not essential geometrical discussion, it suffices to note that said ramps, said mechanical linking elements, said mobile arms, their points of application on the respective structures, said jointed arms must be dimensioned, positioned and joined to each other so that the lifting of said mobile structure, exemplified by the upper side members 5-A and 5-B—with respect to said fixed structure—causes the translational-rotatory motion which naturally entrains an equivalent movement in the axes of the respective rotating shafts, because the latter are connected to said upper mobile structure—which includes said side members 5-A and 5-B—by said brackets 40, 41.

The translational-rotatory motion of said rotating shafts 32-C causes the lifting of the respective second linking elements 54, which drag said auxiliary shaft 55 and also the arms 56-A, 56B, 56-C . . . , so that the tips of the respective ramps—which are connected to said arms—maintain substantially the same height separation H1 on the respective groove, while instead the inclination of said ramps changes with said translational movement following a rotatory path (see FIG. 11).

A person skilled in the field is perfectly capable of imagining and defining the necessary dimensions; only for greater clarity, FIG. 12 gives an extremely simplified schematic view of the devices involved, that have been described in the two conditions of minimum and maximum distance between the side members of the two structures, the fixed one and the mobile one.

In said schematic are shown, in particular:
the upper side member 5-A in the two said positions;
the axis "X" of the rotating shaft in the two corresponding positions;
the mechanical connections 53, 54, in the two corresponding positions, in which the position of maximum distance defined above is identified with: 53, 53A and 54, 54A, respectively;
the connecting pole 50, in the two corresponding positions 50 and 50A;
and finally the relative ramp, that here for greater convenience will be identified in the two corresponding positions 71 and 72.

Since it is desired that the tip 11-P of the ramp 71-72 maintain a constant and definite height H1 with respect to the underlying groove, it will be sufficient to dimension the devices involved so as to achieve such condition.

The operation of the improved apparatus described above is as follows: when the height of the ramps is to be changed, the upper mobile structure is lifted from the fixed structure by known means of conventional type.

By the effect of such lifting, said mobile structure is moved upward, but with a movement of "parallelogram" type as explained above.

Said movement of the upper structure also entrains with it, through said brackets 40, 41, the corresponding rotating shaft 32C, which entrains in turn the mechanical linking elements 54, 53 and the auxiliary shaft 55 interconnected between them.

Since the first linking element 53 is connected, through the pin 52, to the connecting pole 50 which is in turn pivoted at the other end 51 to the lower fixed structure, it follows that the effect of the mechanical connections described, combined with the lifting of the upper structure (side members 5-A and 5-B) causes the lifting of the pole 50.

A comparative examination of the positions of the devices described above, as can be seen in the FIGS. 2A, 3A, 4A, where FIGS. 2A and 4A show the two end positions that can be reached by the upper mobile structure, indicates that lifting of the upper mobile structure causes the lifting of the connecting pole 50, and since this is connected to the pin 51, said lifting of the relative end 52 causes the clockwise rotation of the pole itself 50, and thus, through said connections 53, 54 and the shaft 55, also the rotation of the arm 46-A, 46-B, 46-C, . . . and of the respective ramp 11-1.

However, as the movement of said ramp 11-1 is a complex movement, resulting from the combination of the movement of parallelogram type of the upper mobile structure and of the rotatory movement of the mechanical connections 53, 54, and also of the auxiliary shaft 55 about the shaft 32-C, which is in turn connected to the upper mobile structure, the final effect on the ramp 11-1 is its clockwise rotation which, with a suitable sizing of the devices involved, can generate an increase, with reference to FIG. 12, of the inclination of the ramp from one position 71 to another position 72.

It will also be evident that FIGS. 3A, and 4A, although they illustrate only the three cutting modules that include the three rotating shafts 32A, 32B and 32C, also apply to all the other cutting modules, not shown in said figures, since all the cutting modules are engaged in a manner identical to those of said upper structure, naturally apart from their position with respect to the latter.

All said devices involved can therefore ensure that, with easy applications of geometrical type, said ramp and therefore in particular its upper edge are inclined so as to be at a greater height, thus making it possible to process clusters having stems of different lengths, without resulting in negative consequences:
on the reciprocal positioning between the ramp and the relative rotating shaft, and thus the relative rotating blade;
nor on the height of the tip of the ramp itself on the respective raised portion, on which are straddled the clusters of products that are brought there to be intercepted and lifted and finally cut by the relative blade.

The basic objective of the invention is thus easily and effectively achieved: since all the cutting modules are connected and supported by the two side members 5-A and 5-B it is in fact possible, with the means and manners illustrated above, to adjust in a single and simple operation all the cutting modules, each of them connected with the relative blades and also with the relative ramps. In fact, it will be sufficient to lift or to lower with a single operation the position of the mobile structure, and thus according to the invention also the two side members 5-A and 5-B that are part of it, to achieve the basic objective of the invention of being capable of adjusting, in a single operation, not only the inclination of all the ramps of all the cutting modules supported by said mobile structure, but also all the rotating shafts and the relative blades.

It will be evident to a person skilled in the field that the devices and the lifting/lowering modes and the relative control of said mobile structure are methods completely within the area of expertise of said person, and therefore they will not be specified further.

Finally, with reference to FIGS. 7A and 10, it has been found suitable and advantageous that each of said ramps 11-1, 12-1, 13-1, . . . has, on the respective upper edge 11-2, 12-2, 13-2, . . . , a respective groove 11-3, 12-3, 13-3, . . . suitable to accommodate the lower edge of the respective rotating blade 11, 12, 13, . . .

In fact, this characteristic makes it possible that between the blade itself and the respective upper edge of the respective ramp there will be a corresponding acute angle within which is automatically inserted and pushed the stem to be cut, so that said stem cannot escape by slipping off from under the blade, and so that (see FIG. 10) the cutting angle "t" between the radius "R" that connects the axis "X" of the rotating shaft and the point of virtual interference "C" between the cutting perimeter of the blade 11 and the profile of the respective upper edge 11-2 of the corresponding ramp 11-1 is sufficiently high, and at any rate greater than 90°.

In order to overcome the problem described in the introduction to the present patent, i.e. the need to eliminate all obstructions from the surface of the movable table, the solution adopted in order to prevent the devices described above from interfering with the movement of the cherries transported by said table 100 in its translational movement, consists in the partial lifting of both said ramps and the relative rotating blades, so that the latter move away from the movable table 100 and position themselves at such a height above it that they no longer constitute an obstruction for the objects, in particular the bunches of cherries, that are transported by said movable table.

In particular, with reference to FIGS. 13, 14 and 15, and from 19 to 22, certain mechanical maneuvering means are provided, linked to the basic apparatus and articulated in such a way as to modify and improve it, so that their effect and operation is such that it causes the rotation of said auxiliary shaft 55 around its center of rotation corresponding to axis "X", so that said upper edges 11-2, 12-2, 13-2 . . . and the respective tips 11-P, 12-P, 13-P, 14-P of the respective said ramps 11-1, 12-1, 13-1, 14-1 . . . , are rotated by a pre-determined angle "Δ" so as to cause the rotational lifting of said ramps.

Naturally said table may retain its original characteristics, since the present invention brings a purely incremental improvement with respect to the known art, and therefore said table 100 still features a plurality of parallel grooves 20, 21, 22, 23 . . . basically orthogonal to said rotating shafts 32A, 32B, 32C . . . , said grooves being reciprocally separated by respective raised portions 20-A, 21-A, 22-A, 23-A . . . , in which said table moves in a parallel direction with said groves, and therefore perpendicularly to said rotating shafts 32A, 32B, 32C . . . , and in which said ramps are arranged to correspond with said respective grooves, and the projection of each of said ramps with respect to one of said grooves is aligned with the selfsame groove.

In order to materially create this solution, and with particular reference to FIGS. 13 and 14, a geometric and schematic outline of how the invention operates is shown; however, even though said figures are purely schematic, they are entirely correct and self-sufficient to explain the logic and manner of operation of the invention.

The apparatus of the invention is illustrated in FIG. 13, with a vertical and lateral plane view, identical to the view used for FIG. 12.

Therefore, the fixed horizontal side member 1A is shown, to which said articulated pole 50 is attached; the lower end 51 of the pole is pivoted to said side member 1A, as already explained above.

Under normal operating conditions, i.e. with the ramps normally tilted over the table 100, observe the position of the first mechanical connection 53, pivoted to said articulated pole 50 through its lower end 52, and to said auxiliary shaft 55 through its upper end; as specified above, said auxiliary shaft 55 is engaged to rotate inside a suitable housing inside a second mechanical connection 54, which in its turn supports, at the opposite end, rotating shaft 32-C which is considered in the present explanation.

The fundamental aspect of the invention is the fact that the articulation:
  of said lower end 52 of the first mechanical connection 53,
  and the corresponding end of said articulated pole 50,
consists in a freely rotating pivot connection; this allows said first mechanical connection 53 to be able to rotate with respect to said articulated pole 50.

Now observe FIG. 14; it represents exactly the same image shown in the previous FIG. 13, except that, in addition to this same first image, a second image has been superimposed, corresponding to the same first image, in which, however, the position of said end 51 has been shifted to the right, to a new position 51A, therefore in the opposite direction to the one of said table 100.

The result of this shift is that:
  said articulated pole 50 moves to the new position 50A,
  said first mechanical connection 53 moves to the new position 53A; this is due to the fact that it must rotate around its geometrical axis "Y" which, however, as widely demonstrated by a comparison between FIGS. 13 and 14, and by a comparison between FIGS. 19 and 20, must rotate around axis "X", whose spatial position, on the other hand, remains constant (see FIGS. 13 and 14).
  Basically said first mechanical connection can only move as a spoke projecting from said auxiliary shaft 55;
  the lower end 52 of the first mechanical connection 53A moves to the new position 52A; this position is identified by the intersection of the two arcs of a circle, the first radius of which is given by the first mechanical connection 53A with fixed pivot in 55, and the second radius is given by the articulated pole 50A with its new pivot in 51A.

Since the link between the first mechanical connection 53A and the second mechanical connection 54A is rigid, and both are engaged on the same auxiliary shaft 55, it is inevitable that, with reference to FIG. 14, if said articulated pole moves to the left, then said end 52A of said first mechanical connection 53A is rotated counter-clockwise by an angle "Δ", and therefore also said second mechanical connection 54A is rotated in the same counter-clockwise direction, and this has the effect of pulling in the same direction, and by the same angle "Δ", both the rotating shaft 32-C and the respective blades and ramps; it is clearly illustrated in FIG. 14 that the new position 11-1(B) taken up by the ramp previously identified as 11-1, has been rotated, logically, by the same angle "Δ" by which the new position of connection 53A has been rotated with respect to the initial position 53.

The evident, final and desired effect is that both said rotating shaft and the relative blades and ramps are lifted off the table 100.

It should be observed, in particular, with reference to FIG. 14, that the axis originally identified as "Y", around which the auxiliary shaft 55 rotates, after the activation of the invention and therefore after the rotational lifting of the ramps, moves to the corresponding position "Y1"

In order to determine the new position of the end 52A, which "pilots" the entire manoeuvre, it must naturally be kept in mind that this is the intersection of two circumferences whose radiuses are, respectively, 50 and 53, whose linear dimension must obviously remain constant since they are two material arms.

Naturally, said angle "Δ" of rotation of the assembly 53, 54, shaft 32, respective blades and ramps, could be any angle whose magnitude is suitable to lift said ramps and relative rotating blades to a sufficient height to remove all obstacles to the passage of the underlying bunches of cherries; however, the optimal solution is, of course, to cause said auxiliary shaft 55 to rotate around its center of rotation corresponding to axis "X" by such a degree that the upper edges 11-2, 12-2, 13-2, etc. . . . , and as many tips 11-P, 12-P, 13-P, 14-P of corresponding ramps 11-1, 12-1, 13-1, 14-1 . . . are positioned horizontally, so as to maximize their distance from the underlying table 100; in FIG. 14 it is illustrated, for the sake of simplicity, that the position and direction of ramp 11-1 have shifted to the new position 11-1(B), i.e. to a basically horizontal position, since it becomes parallel with the table 100 which was described above as a horizontal table.

From the point of view of construction, the present invention may be built as follows:

with reference to FIG. 15, a horizontal slide or pole 60 is arranged, sliding horizontally along axis "Z", aligned with the side member 1A; in the description that follows it is to be understood that what is specified regarding side member 1A extends identically to the construction and assembly of parallel side member 1B, considering the basic symmetry of the apparatus with respect to a vertical plane, median with respect to said side members, and parallel to the movement of table 100.

Said slide 60 is equipped, at the top, with a plurality of appendages 61, 62, 63, 64 . . . that extend upwards and which are equipped, in their respective upper projections, with respective holes 61A, 62A, 63A, 64A.

With reference to FIG. 16, said slide 60 is inserted and made to run inside a groove 90 set in a dedicated structure placed next to side member 1A . . .

and stretching alongside it, in such a way that said slide can run inside said groove with axis "Z"basically horizontal and parallel to the motion of table 100, and therefore, given the described design, also arranged in a plane, not shown, basically orthogonal to said rotating shafts 32-C, 32A, 32B . . . .

Basically, said side member 1A is "U"-shaped, and said slide 60 is disposed in the relative central groove 90.

With reference to FIGS. 15, 16 and 17, a lower arm 73 is disposed in a definite position of said slide 60, and it projects downward from a through opening 80 found on the bottom side of said side member 1A.

To a lower end of said lower arm 73 is attached the end 85 of the piston of an actuator 82, preferably a pneumatic cylinder whose body is engaged onto a portion of the relative side member 1A.

After mounting the assembly, consisting of said slide 60 and relative appendages and arms, into side member 1A, as illustrated in the figures, each lower end 51 of a respective articulated pole 50 is engaged rotationally, i.e. is pivoted in a corresponding hole 61A, 62A, 63A, 64A.

With reference to FIG. 14, it can be observed that, if said actuator 82 is activated, the latter, exerting a force on the side member 1A on which it is mounted, pushes said lower arm 73, and therefore the entire pole 60, in a direction or in the opposite direction to said appendages 61, 62, 63 . . . in any case, still along said axis "Z".

Appendage 62 in the drawing, bearing the respective upper hole 62A to which said lower end 51 of the relative articulated pole 50 is pivoted, shifts to the new position 62-N.

In said new position, obviously the articulated pole 50 remains pivoted onto the upper hole 62A of the same appendage 62, and therefore its lower end is drawn to the new position 51A, which finally causes the articulated pole to move to the new position 50A, already describe above.

Moreover, FIGS. 19 and 21 illustrate quite clearly, both in flat projection and in perspective, the operating condition in which the ramps are slanted, corresponding to FIG. 13; and in a wholly similar manner FIGS. 20 and 22 illustrate quite clearly, both in flat projection and in perspective, the operating condition in which the ramps are rotated to the horizontal or "at-rest" position, which correspond to FIG. 14.

By means of said construction, and by performing the above-described manoeuvre, it becomes possible, easy and instantaneous to activate said actuator 82 and obtain the consequent movement of said lower ends 51 along the respective side member 1A in the horizontal and longitudinal direction and in the opposite direction to the respective rotating shaft 32, whose axis is indicated by said axis "X", which causes not only the shifting but alto the rotation of said articulated poles 50, with the previously explained effect that the connected auxiliary shafts 55, and relative ramps and rotating blades are rotated in such a way that they are lifted off table 100, thus clearing the way for the passage and manual processing of the products that are placed on it.

The invention claimed is:

1. An apparatus for the separation of vegetable products, especially cherries, said apparatus comprising:
    a fixed supporting structure comprising a frame and two parallel horizontal bars which define an inner substantially plane surface,
    a carrier arranged inside said surface and configured to receive and transport vegetable products with a rectilinear motion,
    a plurality of cutting modules, successively arranged over said surface, each module comprising a rotating shaft having a plurality of rotating blades arranged at fixed positions along its length, said shafts of the respective cutting modules being parallel to each other and mounted above the carrier, said carrier transporting the products placed thereon towards said rotating blades,
    a plurality of positioning ramps, each ramp mounted in correspondence to a respective rotating blade, said ramps having an elongated shape extending in the direction of movement of said carrier, said shape of each ramp being flattened and vertically oriented, each ramp having an elongated upper edge that is oriented downwards and towards said carrier with such an inclination that the height of each said edge increases in the direction of motion of said carrier,
    a movable frame comprising two substantially parallel bars said movable frame having a geometry corresponding to the geometry of said fixed supporting structure, said movable frame overlying said fixed supporting structure and being connected to said fixed supporting structure by a plurality of movable arms, each movable arm being connected, on one end to a position said fixed supporting structure and on an opposite end to a respective position of said movable frame, wherein said ends of each respective movable arm are arranged on different vertical straight lines, whereby said apparatus is configured to shift said movable frame with respect to said fixed support structure through a translation motion according to a rotating path, wherein said movable frame is configured to simultaneously shift said respective rotating shafts, of said cutting modules and the respective ramps with respect to said fixed support structure with a sole translation motion of said movable frame according to a rotating path, wherein the axes of said rotating shafts are mounted on said movable frame, said carrier being configured to transport a product cluster placed thereon towards said ramps, mechanical linkage for each cutting module, said linkage comprising an articulated pole pivoted at its lower end to a fixed position of said supporting structure and at an opposite end to a first mechanical connection which is engaged to an auxiliary shaft to which a second mechanical connection is engaged, one end of which is provided with a through-hole into which the respective rotating shaft is mounted, wherein the ramp associated to a respective rotating shaft is engaged via a respective arm to the respective auxiliary shaft, and wherein each of said ramps has on its respective upper edge a respective groove configured to receive the lower edge of the respective rotating blade, wherein said apparatus comprises command and operating means configured to rotate said auxiliary shaft around its center of rotation corresponding to said axis so that said upper edges and the respective tips of respective said ramps are rotated so to raise in a rotating way said ramps to a selected angle.

2. An apparatus according to claim 1, wherein said selected angle is so sized that said upper edges are horizontally lined with the respective said tips.

3. An apparatus according to claim 2, wherein said carrier comprises a member having a plurality of parallel grooves which are substantially orthogonal to said rotating shafts, said grooves being reciprocally spaced by respective relief portions, and wherein said member moves parallel to said grooves and therefore orthogonally to said rotating shafts, wherein said ramps are arranged in alignment with respective grooves, and the projection of each of said ramps with respect to one of said grooves is aligned to the respective said groove.

4. An apparatus according to claim 1, wherein said carrier comprises a member having a plurality of parallel grooves which are substantially orthogonal to said rotating shafts, said grooves being reciprocally spaced by respective relief portions, and wherein said member moves parallel to said grooves and therefore orthogonally to said rotating shafts, wherein said ramps are arranged in alignment with respective grooves, and the projection of each of said ramps with respect to one of said grooves is aligned to the respective said groove.

5. An apparatus according to claim 4, wherein said ramps, said mechanical linkages, said articulated poles, said auxiliary shaft and said supporting means are configured such that the movement of said movable frame with respect to said fixed support structure causes a translational and rotational shift which imparts a corresponding motion to the axes of the rotating shafts, and which causes the ramps related to the same rotating shaft to shift on a plane substantially orthogonal to the respective rotation shaft, and with a motion comprising the change of the ramp inclination on the respective groove.

6. An apparatus according to claim 1, wherein said command and operating means is configured to translate the lower end of said articulated pole, engaged to said fixed supporting structure, to a different position in a horizontal direction moving away direction from said auxiliary shaft.

7. An apparatus according to claim 6, wherein said fixed support structure further comprises:
a sliding sledge which is slidable with respect to a respective said bar of said fixed structure,
a plurality of connecting points spaced along said sliding sledge and which engage respective lower ends of respective articulated poles.

8. An apparatus according to claim 7, wherein:
said sliding sledge is provided with a plurality of upper appendixes,
and said connecting points are arranged on respective said upper appendixes.

9. An apparatus according to claim 8, wherein said sliding sledge is connected to an actuator configured to move it with a horizontal and rectilinear motion in a direction parallel to said bars.

10. An apparatus according to claim 7, wherein said sliding sledge is connected to an actuator configured to move it with a horizontal and rectilinear motion in a direction parallel to said bars.

11. An apparatus according to claim 10, wherein:
a through-opening is arranged on the bottom side of each said bar,
said sledge is provided on its bottom side with a lower arm crossing said through-hole,
and said actuator comprises a hydraulic or pneumatic cylinder connected at one of its ends to a fixed point of said bars and at its opposite end to said lower arm.

12. An apparatus according to claim 1, wherein said fixed supporting structure comprises a frame and two parallel horizontal bars which define an inner substantially planar and rectangular surface.

* * * * *